US008295526B2

(12) United States Patent  
Bastyr et al.

(10) Patent No.: US 8,295,526 B2
(45) Date of Patent: Oct. 23, 2012

(54) LOW FREQUENCY ENCLOSURE FOR VIDEO DISPLAY DEVICES

(75) Inventors: Kevin J. Bastyr, St. Francis, WI (US); Jacky Chi-Hung Chan, Framingham, MA (US); Brian J. Gawronski, Framingham, MA (US); Hilmar Lehnert, Framingham, MA (US); Robert Preston Parker, Westborough, MA (US)

(73) Assignee: Bose Corporation, Framingham, MA (US)

( * ) Notice: Subject to any disclaimer, the term of this patent is extended or adjusted under 35 U.S.C. 154(b) by 207 days.

(21) Appl. No.: 12/886,750

(22) Filed: Sep. 21, 2010

(65) Prior Publication Data
US 2011/0037906 A1 Feb. 17, 2011

Related U.S. Application Data

(63) Continuation-in-part of application No. 12/020,978, filed on Feb. 21, 2008.

(51) Int. Cl.
H04R 1/20 (2006.01)
H04R 9/06 (2006.01)
H04R 1/02 (2006.01)
(52) U.S. Cl. ............................. 381/337; 381/89; 381/333
(58) Field of Classification Search .................... 381/89, 381/182, 337, 338, 340, 342, 343, 345, 349; 181/146, 152, 155, 182, 187, 192, 199; 340/461
See application file for complete search history.

(56) References Cited

U.S. PATENT DOCUMENTS

| | | | |
|---|---|---|---|
| 1,577,880 A | 3/1926 | Stuart | |
| 1,755,636 A | 4/1930 | Dubilier | |
| 2,293,181 A | 8/1942 | Terman | |
| 3,378,814 A | 4/1968 | Butler | |
| 3,486,578 A | 12/1969 | Albariono | |
| 3,768,589 A | 10/1973 | Nilsson | |
| 3,940,576 A | 2/1976 | Schultz | |
| 4,340,778 A | 7/1982 | Cowans et al. | |
| 4,373,606 A | 2/1983 | Clements et al. | |
| 4,616,731 A | 10/1986 | Robinson | |
| 4,628,528 A | 12/1986 | Bose et al. | |
| 4,747,142 A | 5/1988 | Tofte | |
| 4,930,596 A | 6/1990 | Saiki et al. | |
| 4,965,776 A | 10/1990 | Mueller | |
| 5,012,890 A | 5/1991 | Nagi et al. | |
| 5,105,905 A | 4/1992 | Rice | |
| 5,197,100 A | 3/1993 | Shiraki | |

(Continued)

FOREIGN PATENT DOCUMENTS

EP 0624045 11/1994
(Continued)

OTHER PUBLICATIONS

Second Chinese Office Action on Chinese Patent Application 200710089694.0, dated Feb. 13, 2012.

(Continued)

*Primary Examiner* — Brian Ensey

(57) ABSTRACT

A television includes a flat panel display device for presenting video images, a housing for supporting the flat panel display device, and a first acoustic volume located substantially (a) inside the housing, and (b) behind the display device. Two or more acoustic drivers are provided for acoustically energizing the acoustic volume. The drivers are positioned such that acoustic energy put into the acoustic volume from the drivers is substantially additive and vibrational energy from the drivers substantially cancels out.

34 Claims, 18 Drawing Sheets

U.S. PATENT DOCUMENTS

| | | | |
|---|---|---|---|
| 5,280,229 A | 1/1994 | Faude et al. | |
| 5,373,564 A | 12/1994 | Spear et al. | |
| 5,375,564 A | 12/1994 | Gail | |
| 5,426,702 A | 6/1995 | Aarts | |
| 5,528,694 A | 6/1996 | Van De Kerkhof et al. | |
| 5,610,992 A | 3/1997 | Hickman | |
| 5,673,329 A | 9/1997 | Wiener | |
| 5,732,145 A | 3/1998 | Tsao et al. | |
| 5,740,259 A | 4/1998 | Dunn | |
| 5,793,000 A | 8/1998 | Sabato et al. | |
| 5,802,194 A | 9/1998 | Yamagishi et al. | |
| 5,809,153 A | 9/1998 | Aylward et al. | |
| 5,815,589 A | 9/1998 | Wainwright et al. | |
| 5,821,471 A | 10/1998 | McCuller | |
| 5,828,759 A | 10/1998 | Everingham | |
| 5,832,099 A | 11/1998 | Wiener | |
| 5,864,100 A | 1/1999 | Newman | |
| 5,870,484 A | 2/1999 | Greenberger | |
| 5,881,989 A | 3/1999 | O'Brien et al. | |
| 5,898,137 A * | 4/1999 | Saito | 181/155 |
| 5,929,392 A * | 7/1999 | Sabato et al. | 181/152 |
| 5,940,347 A | 8/1999 | Raida et al. | |
| 5,956,411 A * | 9/1999 | Edgar | 381/89 |
| 6,002,781 A | 12/1999 | Takayama et al. | |
| 6,067,362 A | 5/2000 | Lemanski et al. | |
| 6,144,751 A | 11/2000 | Velandia | |
| 6,173,064 B1 | 1/2001 | Anagnos | |
| 6,223,853 B1 | 5/2001 | Huon et al. | |
| 6,255,800 B1 | 7/2001 | Bork | |
| 6,275,595 B1 | 8/2001 | Lundgren et al. | |
| 6,278,789 B1 | 8/2001 | Potter | |
| 6,356,643 B2 | 3/2002 | Yamagishi et al. | |
| 6,359,994 B1 | 3/2002 | Markow et al. | |
| 6,374,120 B1 | 4/2002 | Krauss | |
| 6,415,036 B1 | 7/2002 | Ritter et al. | |
| 6,431,309 B1 | 8/2002 | Coffin | |
| 6,477,042 B1 | 11/2002 | Allgeyer et al. | |
| 6,597,794 B2 | 7/2003 | Cole et al. | |
| 6,694,200 B1 | 2/2004 | Naim | |
| 6,704,425 B1 | 3/2004 | Plummer | |
| 6,741,717 B2 | 5/2004 | Dedieu et al. | |
| 6,744,903 B1 | 6/2004 | Jeon et al. | |
| 6,771,787 B1 | 8/2004 | Hoefler et al. | |
| 6,820,431 B2 | 11/2004 | McManus et al. | |
| 6,870,933 B2 | 3/2005 | Roovers | |
| 6,928,169 B1 | 8/2005 | Aylward | |
| 6,963,647 B1 | 11/2005 | Krueger et al. | |
| 7,016,501 B1 | 3/2006 | Aylward et al. | |
| 7,155,214 B2 | 12/2006 | Struthers et al. | |
| 7,212,467 B2 | 5/2007 | Dobbins et al. | |
| 7,283,634 B2 | 10/2007 | Smith | |
| 7,490,044 B2 | 2/2009 | Kulkarni | |
| 7,542,815 B1 | 6/2009 | Berchin | |
| 7,623,670 B2 | 11/2009 | Hoefler et al. | |
| 2001/0001319 A1 | 5/2001 | Beckert et al. | |
| 2001/0031059 A1 | 10/2001 | Borgonovo | |
| 2001/0039200 A1 | 11/2001 | Azima et al. | |
| 2002/0073252 A1 | 6/2002 | Arbiter et al. | |
| 2002/0085730 A1 | 7/2002 | Holland | |
| 2002/0085731 A1 | 7/2002 | Aylward | |
| 2002/0115480 A1 | 8/2002 | Huang | |
| 2002/0150261 A1 | 10/2002 | Moeller et al. | |
| 2002/0171567 A1 | 11/2002 | Altare et al. | |
| 2002/0194897 A1 | 12/2002 | Arnott et al. | |
| 2003/0063767 A1 | 4/2003 | Dedieu et al. | |
| 2004/0173175 A1 | 9/2004 | Kostun et al. | |
| 2004/0204056 A1 | 10/2004 | Phelps | |
| 2004/0234085 A1 | 11/2004 | Lennox | |
| 2005/0013457 A1 | 1/2005 | Sheplak et al. | |
| 2005/0018839 A1 | 1/2005 | Weiser | |
| 2005/0036642 A1 | 2/2005 | Hoefler et al. | |
| 2005/0078831 A1 | 4/2005 | Irwan et al. | |
| 2005/0205349 A1 | 9/2005 | Parker et al. | |
| 2005/0239434 A1 | 10/2005 | Marlowe | |
| 2005/0255895 A1 | 11/2005 | Lee et al. | |
| 2006/0013411 A1 | 1/2006 | Lin | |
| 2006/0046778 A1 | 3/2006 | Hembree | |
| 2006/0046780 A1 | 3/2006 | Subramaniam et al. | |
| 2006/0065479 A1 | 3/2006 | Okawa et al. | |
| 2006/0134959 A1 | 6/2006 | Ellenbogen | |
| 2006/0181840 A1 | 8/2006 | Cvetko | |
| 2006/0250764 A1 | 11/2006 | Howarth et al. | |
| 2006/0253879 A1 | 11/2006 | Lin | |
| 2007/0002533 A1 | 1/2007 | Kogan et al. | |
| 2007/0014426 A1 | 1/2007 | Sung et al. | |
| 2007/0015486 A1 | 1/2007 | Marlowe | |
| 2007/0035917 A1 | 2/2007 | Hotelling et al. | |
| 2007/0036384 A1 | 2/2007 | Struthers et al. | |
| 2007/0086615 A1 | 4/2007 | Cheney | |
| 2007/0217633 A1 | 9/2007 | Copeland et al. | |
| 2007/0226384 A1 | 9/2007 | Robbin et al. | |
| 2007/0239849 A1 | 10/2007 | Robbin et al. | |
| 2007/0247794 A1 | 10/2007 | Jaffe et al. | |
| 2007/0269071 A1 | 11/2007 | Hooley | |
| 2008/0152181 A1 | 6/2008 | Parker et al. | |
| 2008/0232197 A1 | 9/2008 | Kojima et al. | |
| 2009/0003639 A1 | 1/2009 | Aylward | |
| 2009/0157575 A1 | 6/2009 | Schobben et al. | |
| 2009/0214066 A1 | 8/2009 | Parker et al. | |
| 2009/0225992 A1 | 9/2009 | Konagai | |
| 2009/0252363 A1 | 10/2009 | Ickler | |
| 2009/0274329 A1 | 11/2009 | Ickler et al. | |
| 2009/0304189 A1 | 12/2009 | Vinton | |
| 2011/0026744 A1 | 2/2011 | Jankovsky et al. | |

FOREIGN PATENT DOCUMENTS

| | | |
|---|---|---|
| EP | 1185094 A2 | 3/2002 |
| EP | 1487233 A1 | 12/2004 |
| EP | 1527801 A3 | 5/2005 |
| EP | 1577880 | 9/2005 |
| EP | 2099238 A1 | 9/2009 |
| EP | 2104375 A2 | 9/2009 |
| FR | 1359616 A | 4/1964 |
| FR | 2653630 A1 | 4/1991 |
| GB | 631799 A | 11/1949 |
| GB | 2432213 A | 5/2007 |
| JP | 2007037058 A | 2/2007 |
| WO | 9611558 A1 | 4/1996 |
| WO | 9820659 A1 | 5/1998 |
| WO | 9851122 A1 | 11/1998 |
| WO | 2004075601 A1 | 9/2004 |
| WO | 2005/104655 A2 | 11/2005 |
| WO | 2006/130115 A1 | 12/2006 |
| WO | 2007007083 A1 | 1/2007 |
| WO | 2007/031703 A1 | 3/2007 |
| WO | 2007/049075 A1 | 5/2007 |
| WO | 2007/052185 A2 | 5/2007 |

OTHER PUBLICATIONS

European Examination Report dated Jul. 21, 2008 for EP Appln. No. 02026327.3.

Japanese Office Action dated Feb. 23, 2009 for related JP Application No. H11-250309.

Meier, et al.; Ein linienhafter akustischer Gruppenstrahler mit ausgeglichenen Nebenmaxima, Acustica vol. 17 1966, pp. 301-309.

Holland, K. R., et al., A Low Cost End-Fire Acoustic Radiator, Institute of Sound and Vibration Research, University of Southampton, Southampton S095NH, UK, J. Audio Eng. Soc., vol. 39, No. 7/8, Jul./Aug. 1991, pp. 540-550.

Reams, et al., The Karlson-Hypex Bass Enclosure, AES, An Audio Engineering Society Preprint, presented at the 57th Convention, May 10-13, 1977, Los Angeles, CA.

Poppe, Martin C., The K-Coupler, A New Acoustical-Impedance Transformer, IEEE Transactions on Audio and Electroacoustics, pp. 163-167, Dec. 1966.

Korn, T.S., A Corner Loudspeaker with Coaxial Acoustical Line, Journal of the Audio Engineering Society, vol. 5, No. 3, Jul. 1957, pp. 138-141.

Ramsey, Robert C., A New Cardiod-Line Mircrophone, Audio Engineering Society, NY, NY, Oct. 5-9, 1959.

Shulman, Yuri, Reducing Off-Axis Comb Filter Effects in Highly Directional Microphones, Audio Engineering Society, Presented at the 81st Convention, Los Angeles, CA, Nov. 12-16, 1986.

Purolator Acoustic Porous Metals, Acoustic Media for Aviation Applications, Aerospace Acoustic Materials, Acoustic Media for Helicopters, pp. 1-4, http://www.purolator-facet.com/acoustic.htm, May 1, 2008.

www.altecmm.com, Oct. 2003, inMotion portable audio stereo.

www.pcstats.com, Jun. 21, 2004, NoiseControl Novibes III HDD Isolation.

www.reviews.cnet.com, Jul. 23, 2004, Creative Travel sound.

www.jbl.com, Jul. 23, 2004, Creative Travel Sound.

www.earsc.com, Jun. 28, 2004, Stereo Speaker.

Steve Guttenberg, "Altec Lansing InMotion", Internet Citation (online) Jun. 10, 2004 (downloaded Nov. 11, 2006) URL: http://reviews.cnet.com/4505-7869 7-30790793.html.

EP05107420.1 European Search Report dated Nov. 20, 2006.

International Search Report and Written Opinion dated Jul. 15, 2009 for PCT/US2009/039709.

Boone, Marinus, M. et al.; "Design of a Highly Directional Endfire Loudspeaker Array". J. Audio Eng. Doc., vol. 57, No. 5, May 2009. pp. 309-325.

Van Der Wal, Menno, et al.; "Design of Logarithmically Spaced Constant-Directivity Transducer Arrays". J. Audio Eng. Soc., vol. 44, No. 6, Jun. 1996. pp. 497-507.

Ward, Darren B., et al.; "Theory and Design of Broadband Sensor Arrays with Frequency Invariant Far-field Beam Patterns". J. Acounstic Soc. Am. 97 (2), Feb. 1995. pp. 1023-1034.

Moulton Dave, The Center Channel: Unique and Difficult; TV Technology, Published Oct. 5, 2005. Retrieved May 13, 2009 from: http://www.tvtechnology.com/article/11798.

Rubinson Kalman, Music in the Round #4, Stereophile, Published Mar. 2004; Retrieved May 13, 2009 from http://www.stereophile.com/musicintheround/304round/.

Silva Robert, Surround Sound—What You Need to Know, The History and Basics of Surround Sound, Retrieved May 13, 2009 from http://hometheater.about.com/od/beforeyoubuy/a/surroundsound.htm.

Linkwitz Siegfried, Surround Sound, Linkwitz Lab, Accurate Reproduction and Recording of Auditory Scenes, Revised Publication Jan. 15, 2009. Retreived May 13, 2009 from http://www.linkwitzlab.com/surround_system.htm.

International Preliminary Report on Patentability dated Jul. 16, 2010 for PCT/US2009/039709.

International Search Report and Written Opinion dated Apr. 27, 2011 for PCT/US2011/024674.

International Search Report and Written Opinion dated Apr. 28, 2009 for PCT/US2009/032241.

Munjal, M. L., Acoustics of Ducts and Mufflers with Application to Exhaust and Ventilation System Design, 1987, pp. 42-152, John Wiley & Sons, New York, NY.

Augspurger, G.L., Loudspeakers on Damped Pipes, J. Audio Eng. Soc., vol. 48, No. 5, May 2000, pp. 424-436, Perception Inc., Los Angeles, CA.

International Preliminary Report on Patentability dated Feb. 18, 2010 for PCT/US2009/032241.

Baily, A. R. "Non-resonant Loudspeaker Enclosure Design", Wireless World, Oct. 1965.

International Preliminary Report on Patentability dated May 19, 2010 for PCT/US2009/032241.

Australian Examiner's first report on Australian Patent Application 2009215768, dated Jan. 20, 2012.

CN OA dated Aug. 27, 2010 for CN Appln. No. 200710089694.0.

Backgrounder; Technical Overview: Zenith/Bose Television Sound System, Summer/Fall 1986, Zenith Electronics Corporation, 1000 Milwaukee Avenue, Glenview, Illinois 60025, 8 pages.

International Search Report and Written Opinion dated Feb. 3, 2012 for PCT US2011/052347.

* cited by examiner

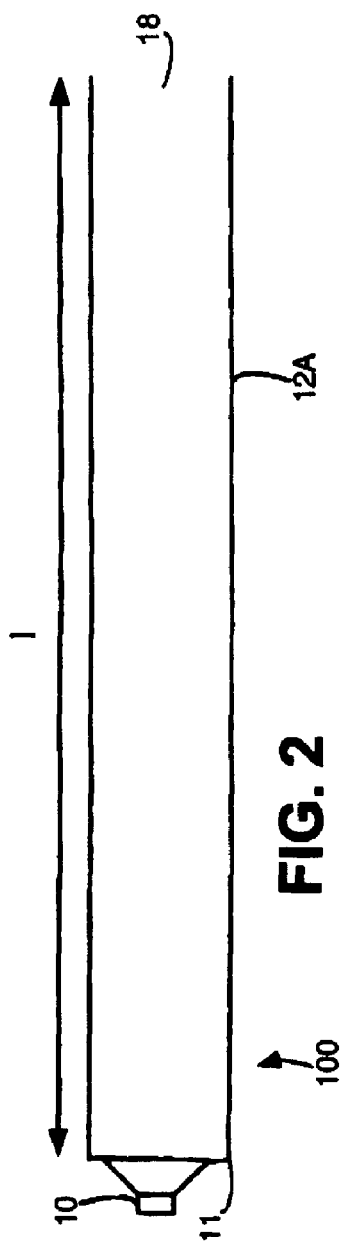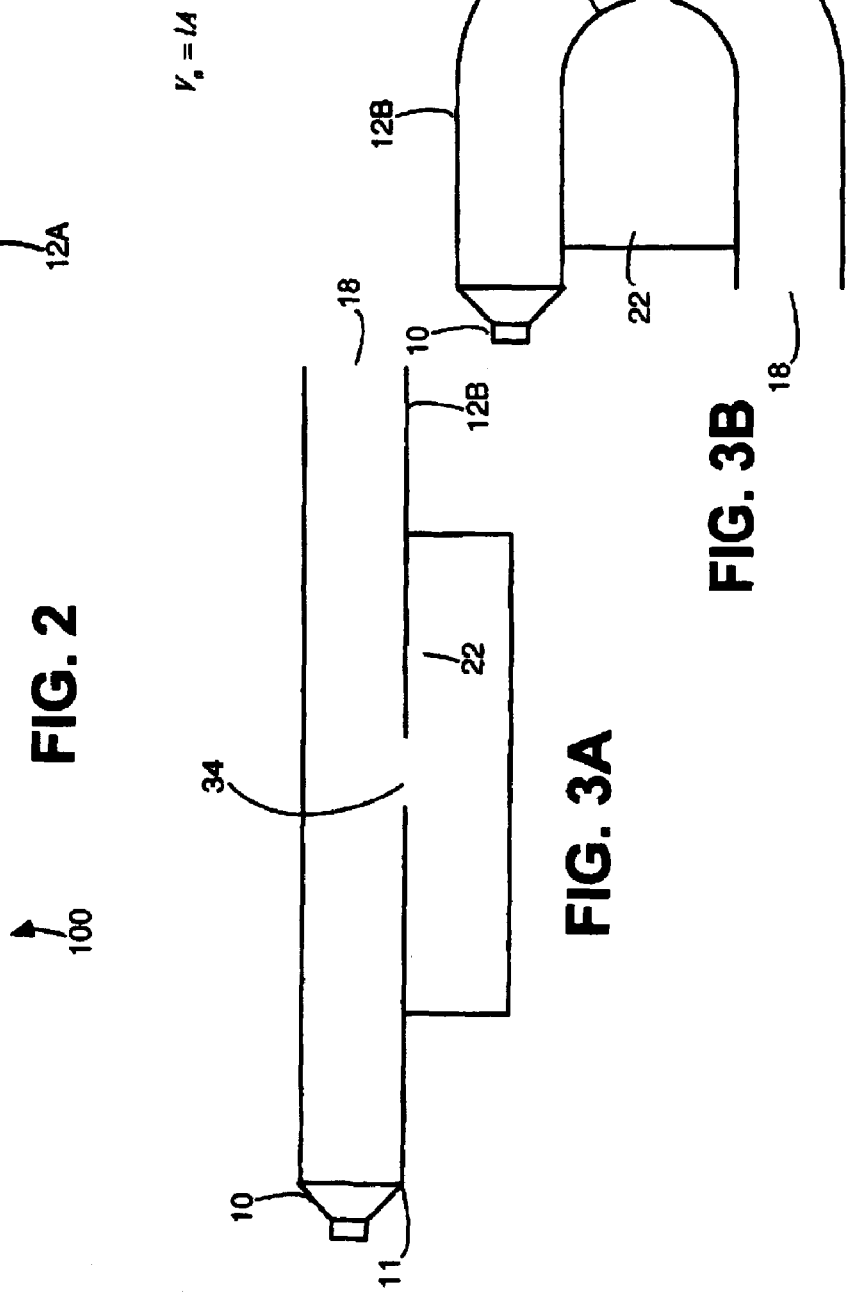

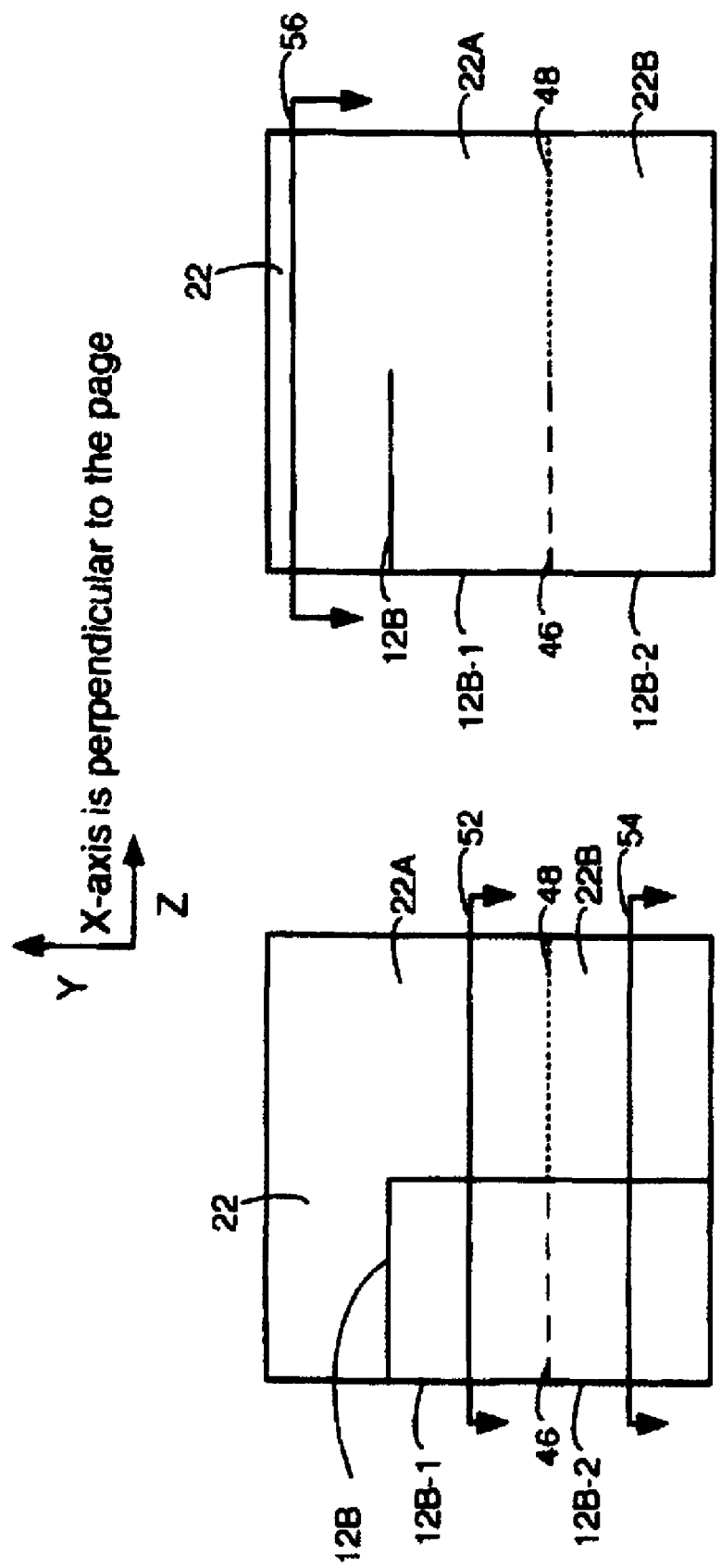

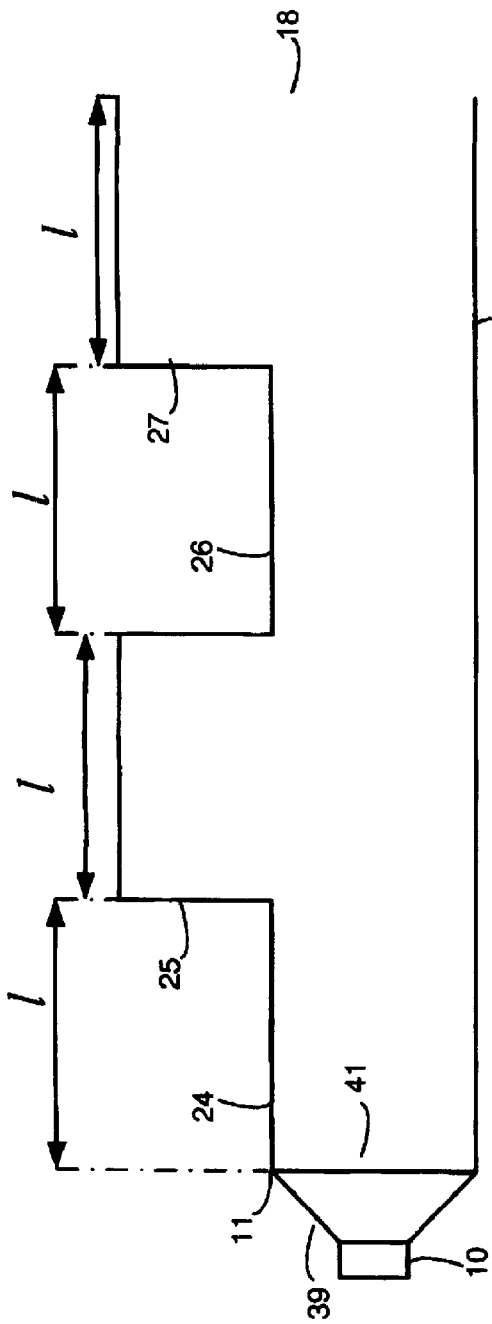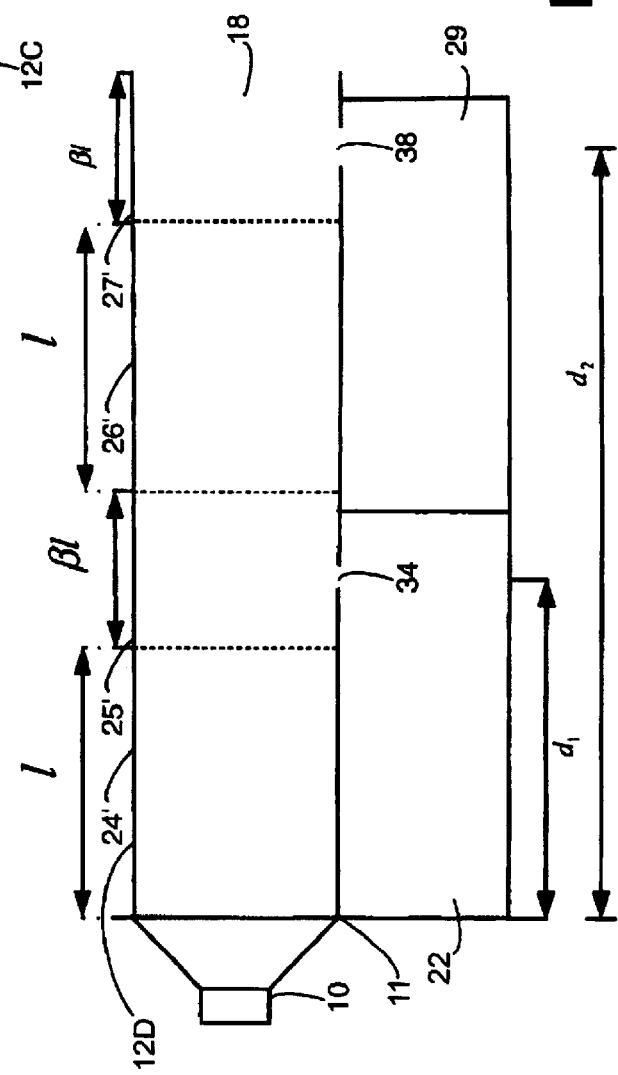

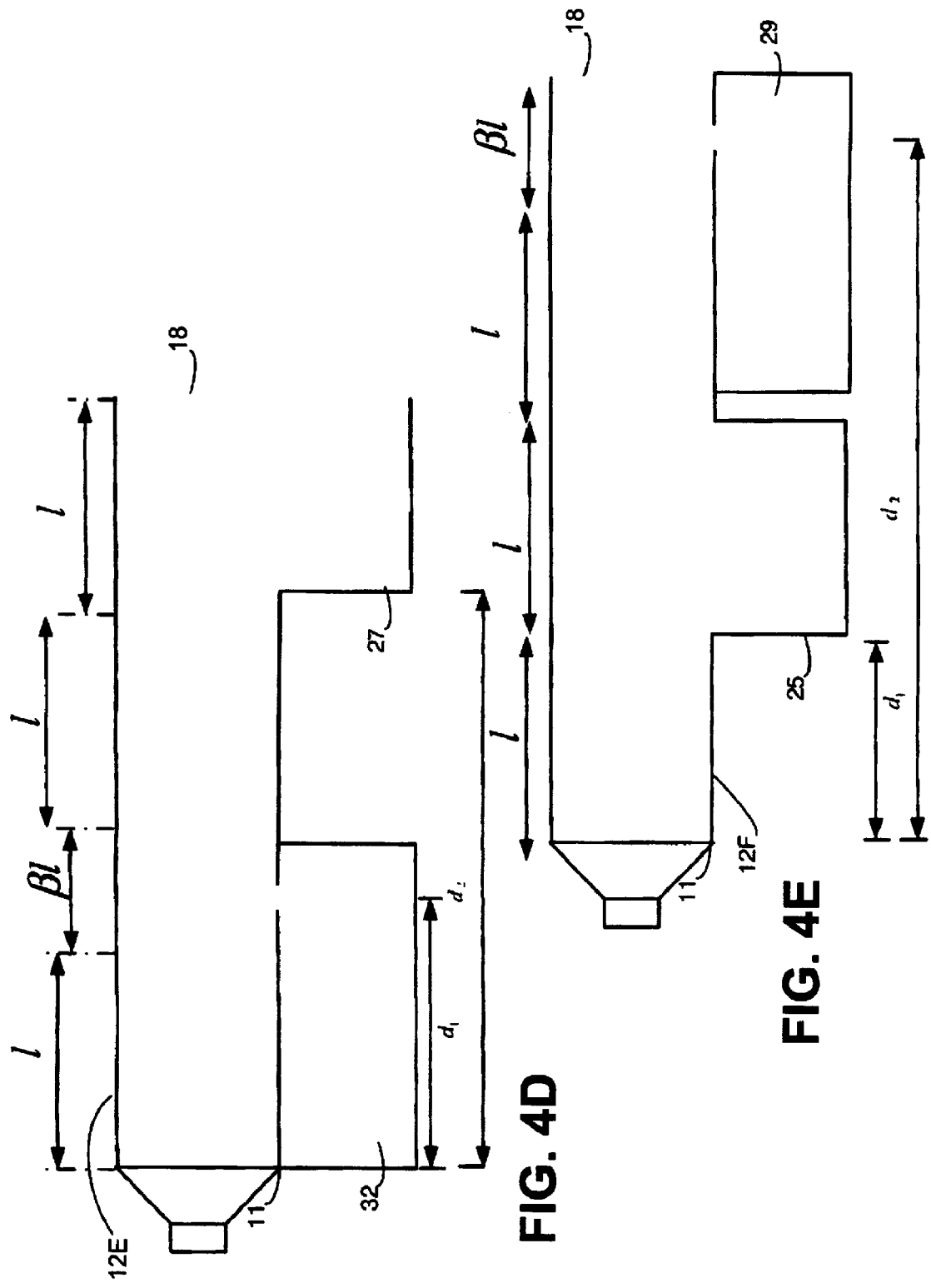

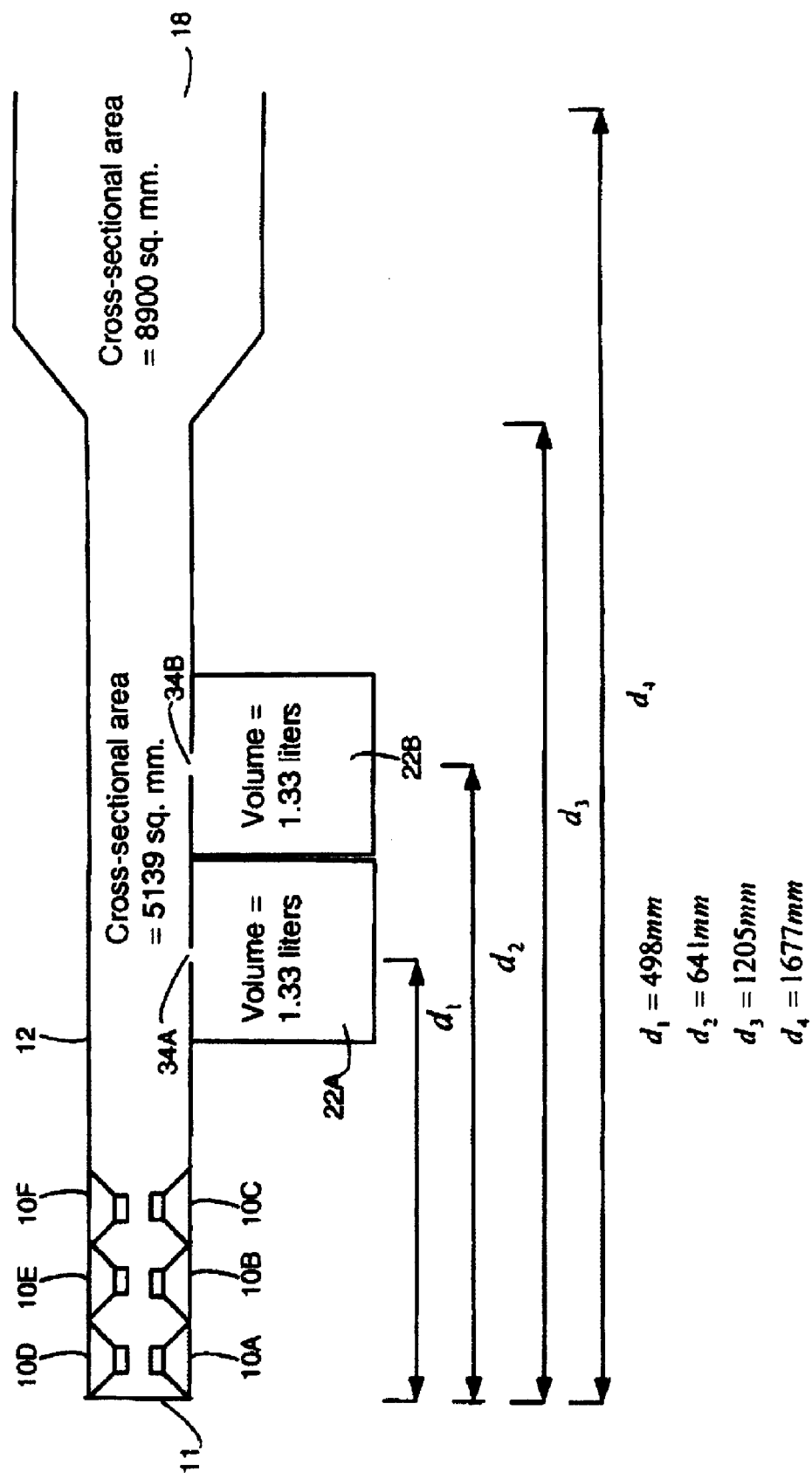

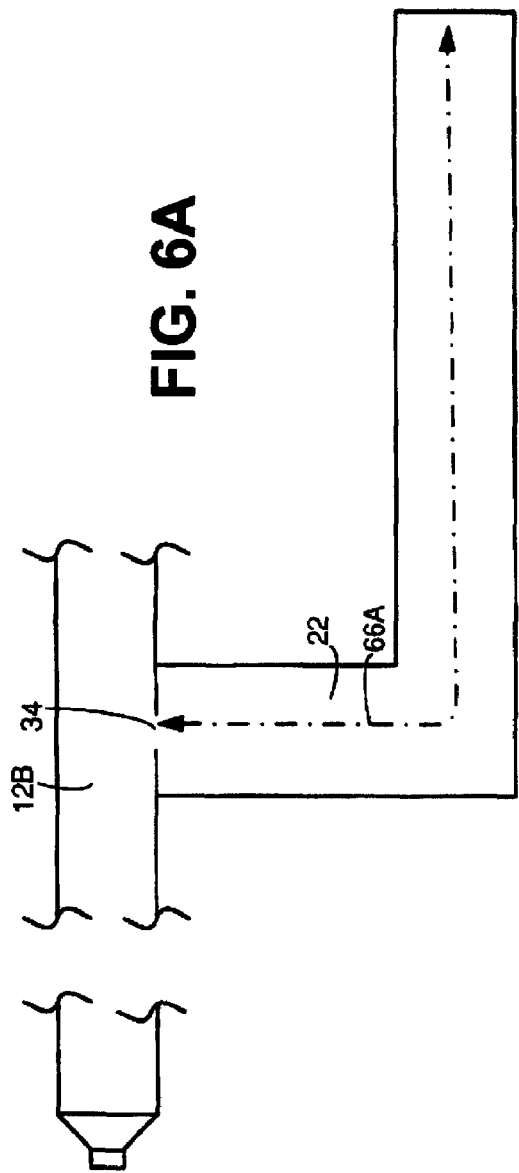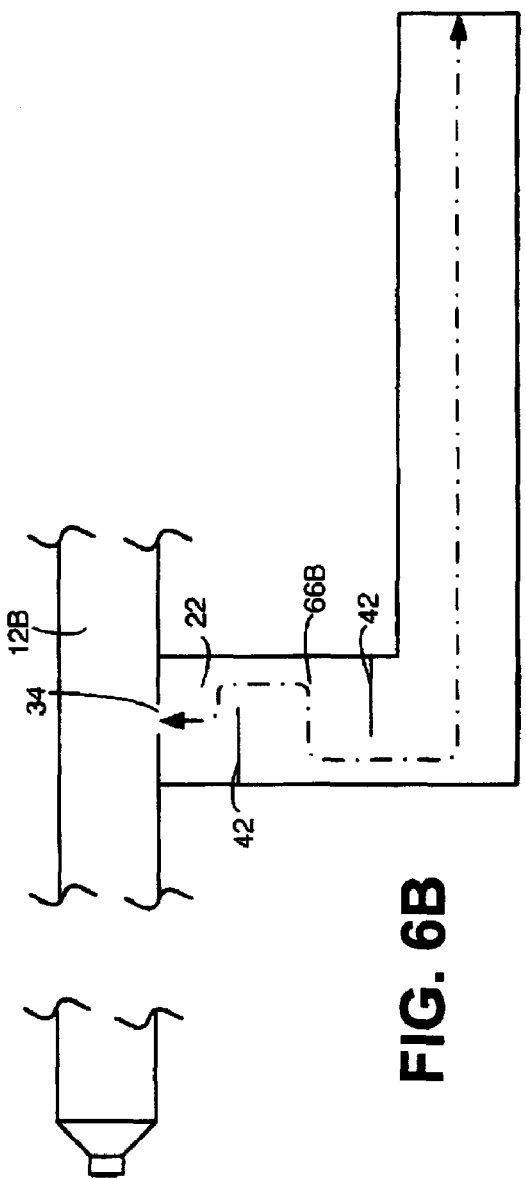

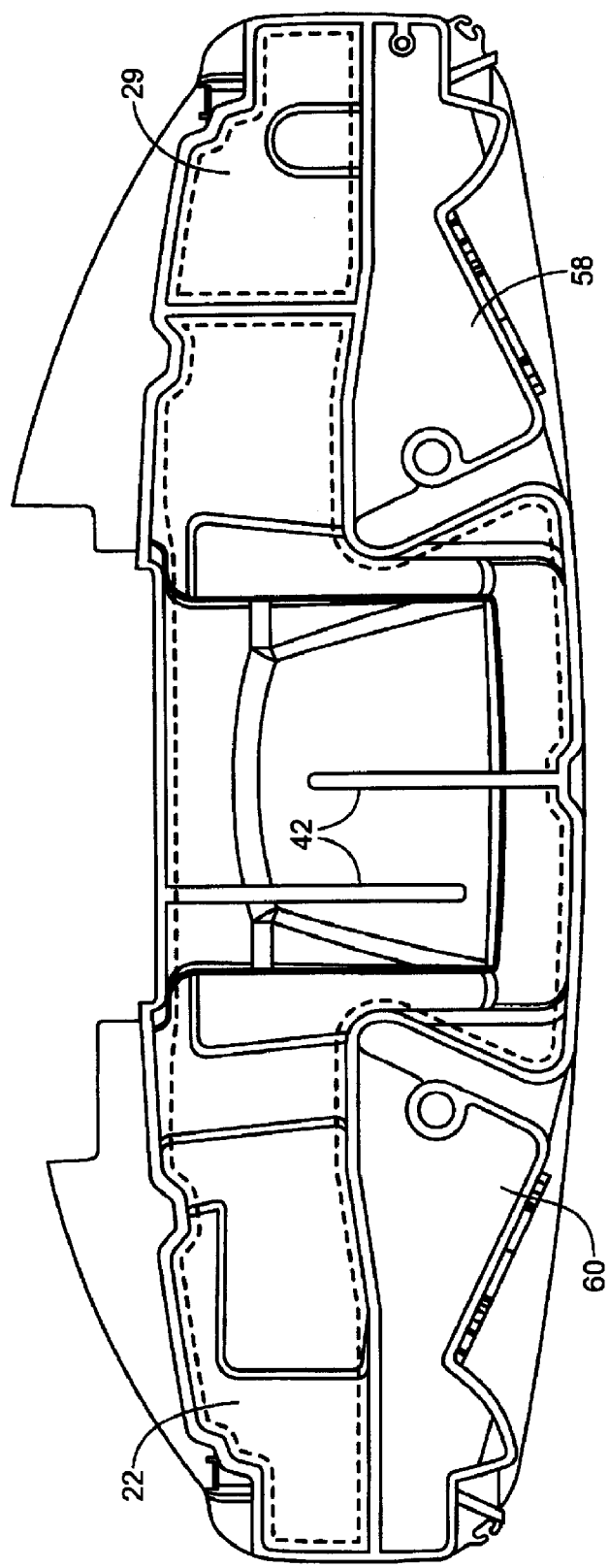

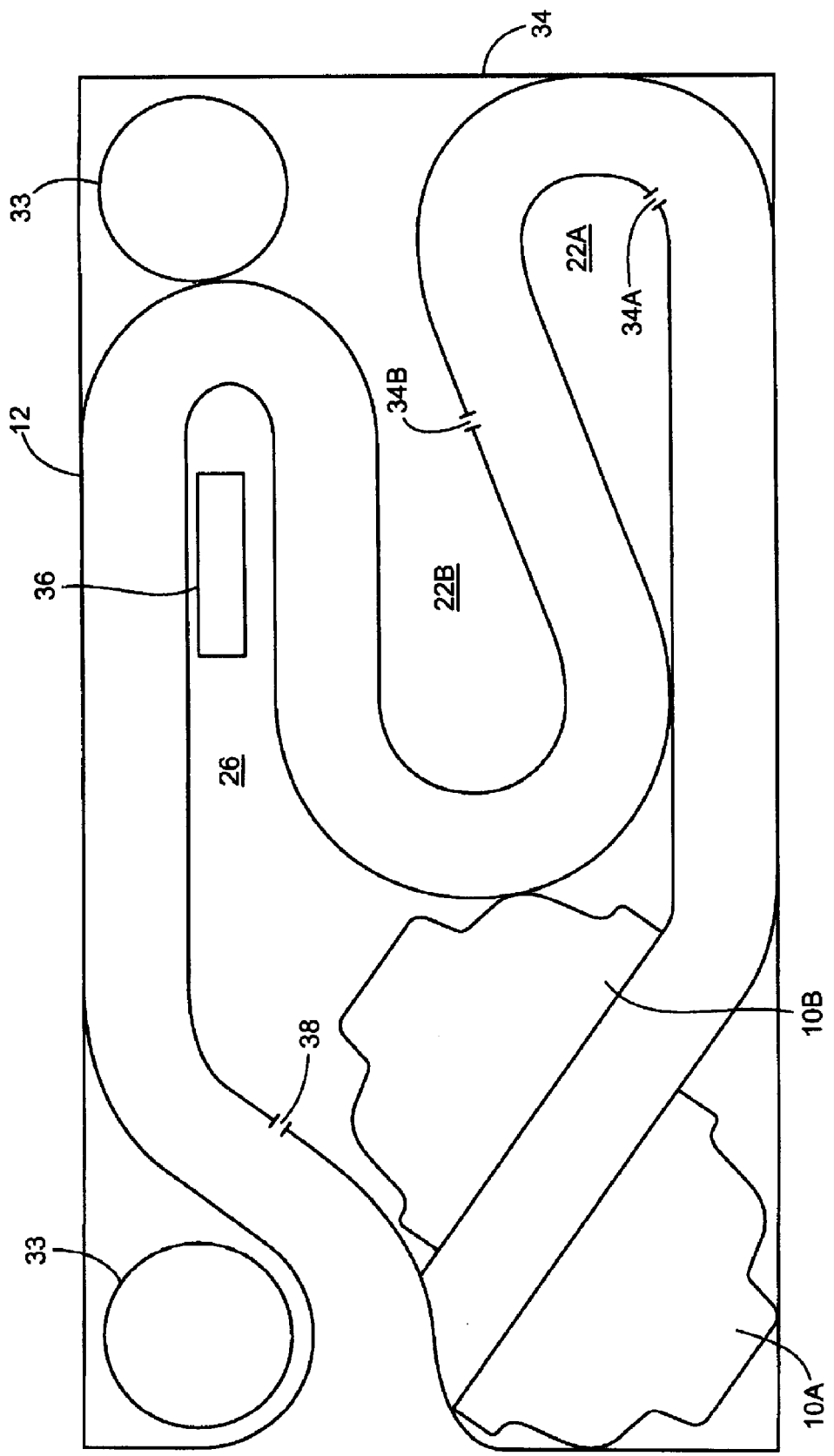

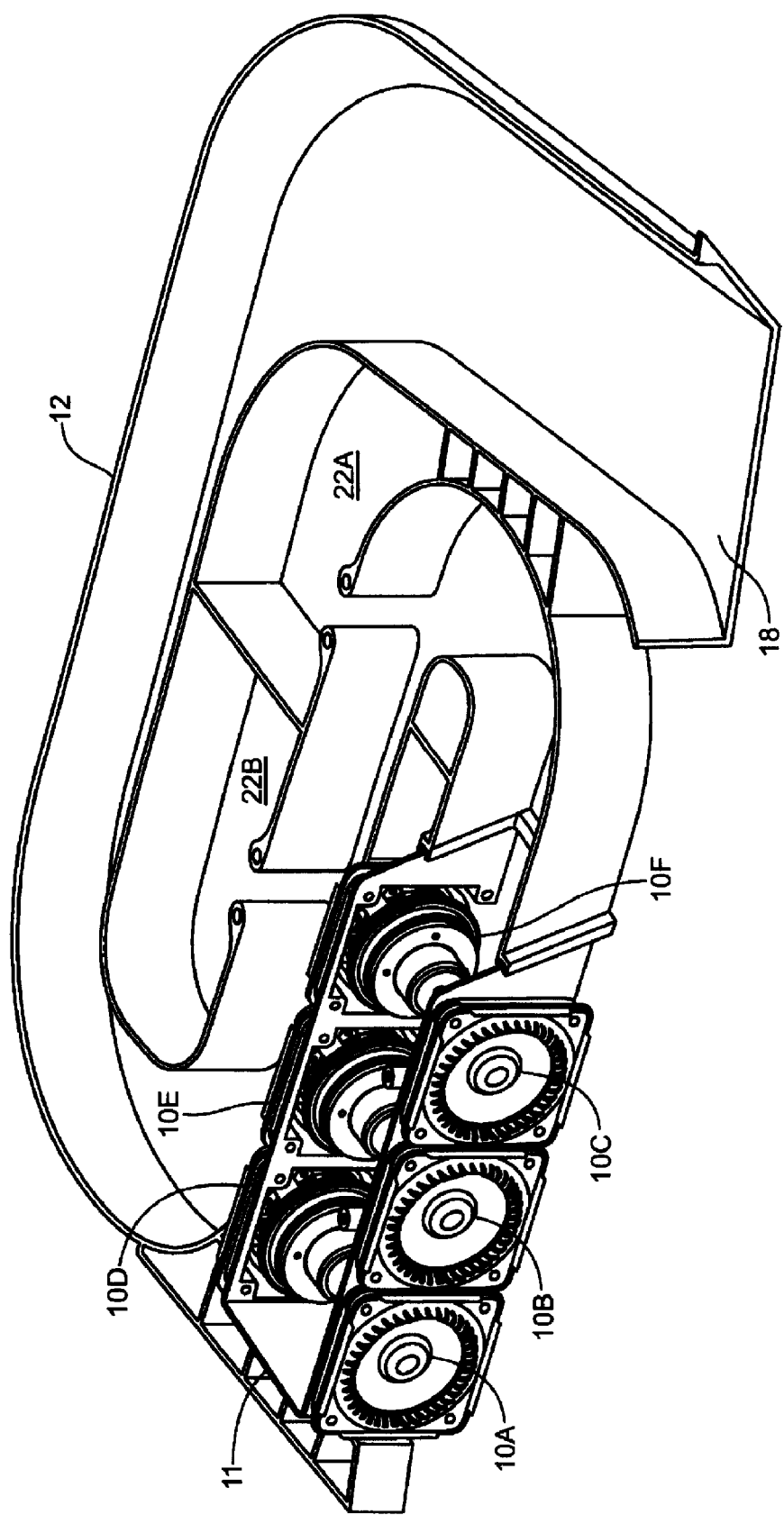

LOW FREQUENCY ENCLOSURE FOR VIDEO DISPLAY DEVICES

This application is a continuation in part of U.S. patent application Ser. No. 12/020,978 which was filed on Feb. 21, 2008 in the names of Parker et al.

BACKGROUND

This disclosure relates to low frequency enclosures integrated in video display devices such as televisions. Acoustic waveguides are described generally in U.S. Pat. No. 4,628,528. Some specific aspects of acoustic waveguides are described in U.S. Pat. No. 6,771,787 and in U.S. patent application Ser. No. 09/753,167.

Televisions have for decades tended to have low performing integrated sound systems, which has prompted users to purchase separate high-performing audio systems. This adds cost and complexity to set up and operation of the system.

In addition, modern televisions (e.g. liquid crystal display (LCD), plasma, etc.) have become more and more thin in a direction normal to the image display surface when compared with older cathode ray tube (CRT) type televisions. For example, Hitachi Consumer Electronics Co., Ltd. sells an Ultra Thin LCD Series of televisions that are 39 mm thick. With the market pressure to sell televisions that are relatively thin, it has become more challenging in recent times to integrate a quality audio system into a television. This problem arises because there is little room within the television housing to place the acoustic drivers and acoustic volume(s) (e.g. a waveguide) that contribute to a high quality audio system. It would be desirable to have a television with a high quality integrated audio system that is still relatively thin.

SUMMARY

In one aspect, a television includes a flat panel display device for presenting video images, a housing for supporting the flat panel display device, and a first acoustic volume located substantially (a) inside the housing, and (b) behind the display device. Two or more acoustic drivers are provided for acoustically energizing the acoustic volume. The drivers are positioned such that acoustic energy put into the acoustic volume from the drivers is substantially additive and vibrational energy from the drivers substantially cancels out.

Embodiments may include one or more of the following features. The acoustic volume includes a waveguide. The acoustic volume has only a single exit to an atmosphere external to the housing. An exit of the acoustic volume to an atmosphere external to the housing faces in a substantially downward direction when the television is placed on a substantially horizontal surface. There are six acoustic drivers which acoustically energize the acoustic volume. Each driver vibrates in a direction that is substantially parallel to a surface of the display device from which video images are projected. The housing has a thickness in a direction that is substantially normal to a surface of the display device from which video images are projected that is less than about 200 mm thick. The first acoustic volume includes an acoustic waveguide; the acoustic drivers being mounted to the waveguide so that a first surface of each acoustic driver radiates sound waves into the waveguide so that the sound waves are radiated from the waveguide and so that a second surface of each acoustic driver radiates sound waves to the environment through a path that does not include the waveguide. A second acoustic volume is acoustically coupled to the waveguide for increasing the amplitude of the sound waves radiated from the acoustic waveguide at a wavelength at which radiation from the waveguide and radiation from the second surface of the acoustic drivers destructively interfere.

In another aspect, a television includes a flat panel display device for presenting video images, a housing for supporting the flat panel display device, and an acoustic volume located substantially (a) inside the housing, and (b) behind the display device. Two or more acoustic drivers are provided for acoustically energizing the acoustic volume. A maximum acoustic output of the drivers measured in an anechoic chamber at one meter from a center of a surface of the display device from which video images are projected averages at least about 80 dBSPL over a range from about 40 hz to about 80 hz.

Embodiments may include one or more of the following features. An outside diameter of a cone assembly including a surround for each acoustic driver is less than about 85 mm. An outside diameter of a cone assembly including a surround for each acoustic driver is less than about 75 mm. An outside diameter of a cone assembly including a surround for each acoustic driver is less than about 65 mm. A maximum stroke peak-to-peak for each acoustic driver is at least about 15 mm. A maximum stroke peak-to-peak for each acoustic driver is at least about 18 mm. A maximum stroke peak-to-peak for each acoustic driver is at least about 21 mm. The maximum acoustic output of the drivers averages at least about 85 dBSPL. The maximum acoustic output of the drivers averages about 90 dBSPL. A total acoustic noise and distortion is less than about 30% when the drivers are outputting the maximum acoustic output. A total acoustic noise and distortion is less than about 20% when the drivers are outputting the maximum acoustic output. A total acoustic noise and distortion is about 10% when the drivers are outputting the maximum acoustic output. The acoustical output at 40 Hz is no more than about 20 dB down from the acoustical output at 80 Hz. The acoustical output at 40 Hz is no more than about 13 dB down from the acoustical output at 80 Hz. The acoustical output at 40 Hz is no more than about 10 dB down from the acoustical output at 80 Hz. A diagonal dimension of the surface of the display from which images are viewable is less than about 152.4 cm. A diagonal dimension of the surface of the display from which images are viewable is less than about 137 cm. A diagonal dimension of the surface of the display from which images are viewable is about 117 cm.

In yet another aspect, a television includes a flat panel display device for presenting video images, a housing for supporting the flat panel display device, and a waveguide located substantially (a) inside the housing, and (b) behind the display device. One or more pairs of acoustic drivers for acoustically energizing the waveguide, wherein the housing is less than about 200 mm thick in a direction that is substantially normal to a surface of the display device from which video images are projected.

Embodiments may include one or more of the following features. The housing is less than about 175 mm thick in a direction that is substantially normal to a surface of the display device from which video images are projected. The housing is less than about 160 mm thick in a direction that is substantially normal to a surface of the display device from which video images are projected. A surface of the display device has a portion from which video images are projected that has a diagonal measurement that is preferably less than about 152.4 cm long. A surface of the display device has a portion from which video images are projected that has a diagonal measurement that is preferably less than about 137 cm long. A surface of the display device has a portion from which video images are projected that has a diagonal measurement that is preferably less than about 117 cm long. The one or more drivers can be operated at maximum acoustic output without visibly vibrating the surface of the display.

Other features, objects, and advantages will become apparent from the following detailed description, when read in connection with the following drawing, in which:

BRIEF DESCRIPTION OF THE SEVERAL VIEWS OF THE DRAWING

FIG. 2 is a diagrammatic view of a waveguide assembly;

FIGS. 3A and 3B are diagrammatic views of waveguide assemblies;

FIGS. 3C and 3D are diagrammatic cross-sectional views of waveguide assemblies;

FIGS. 4A-4G are diagrammatic views of waveguide assemblies;

FIGS. 6A and 6B are diagrammatic views of a portion of a waveguide assembly;

FIGS. 7A-7D are drawings of a practical implementation of loudspeaker systems with waveguide assemblies including features shown diagrammatically in other figures;

DETAILED DESCRIPTION

Figure 1A:
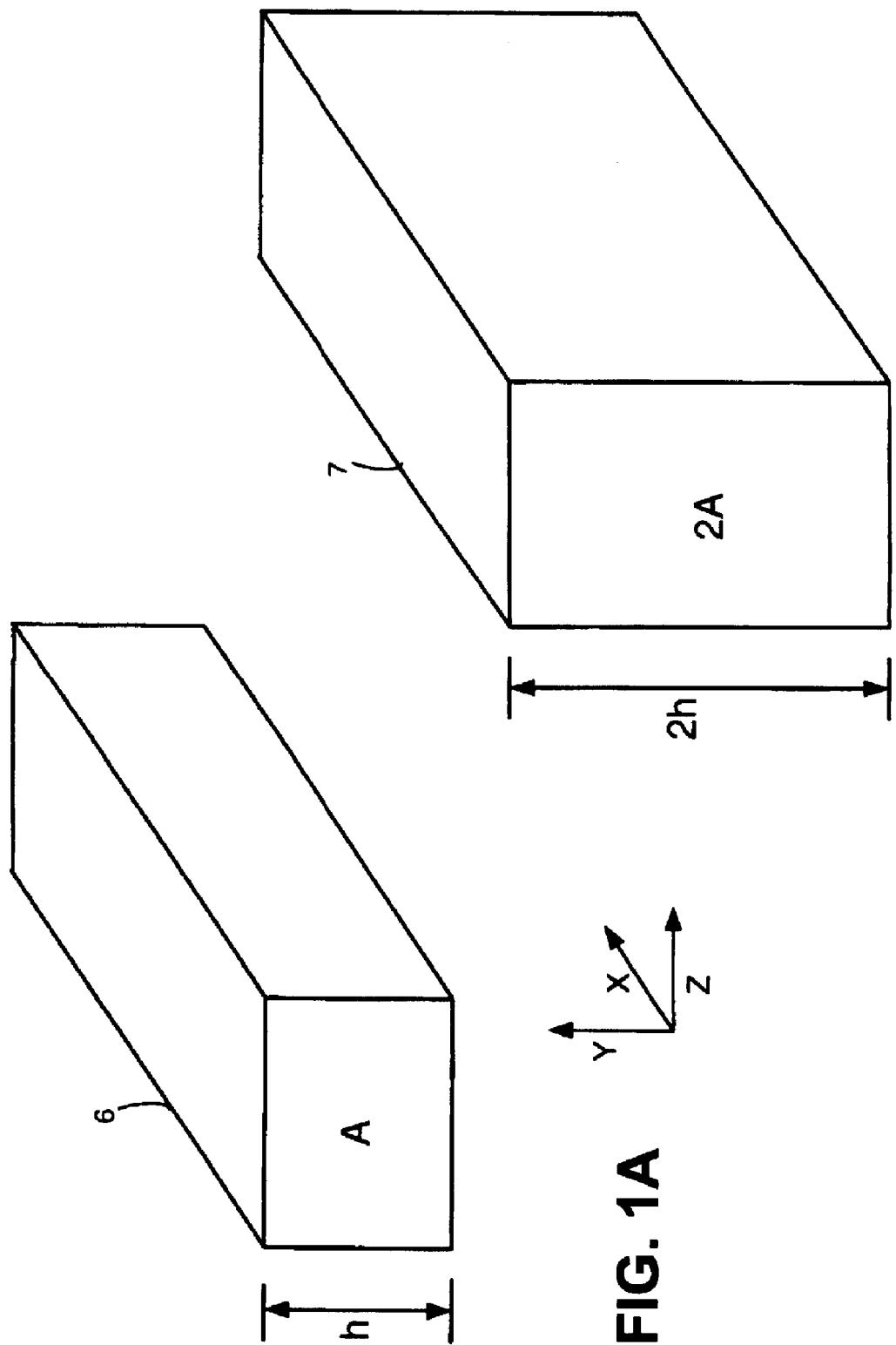
FIGS. 1A and 1B are geometric objects useful in understanding some of the other figures.
Figure 1B:
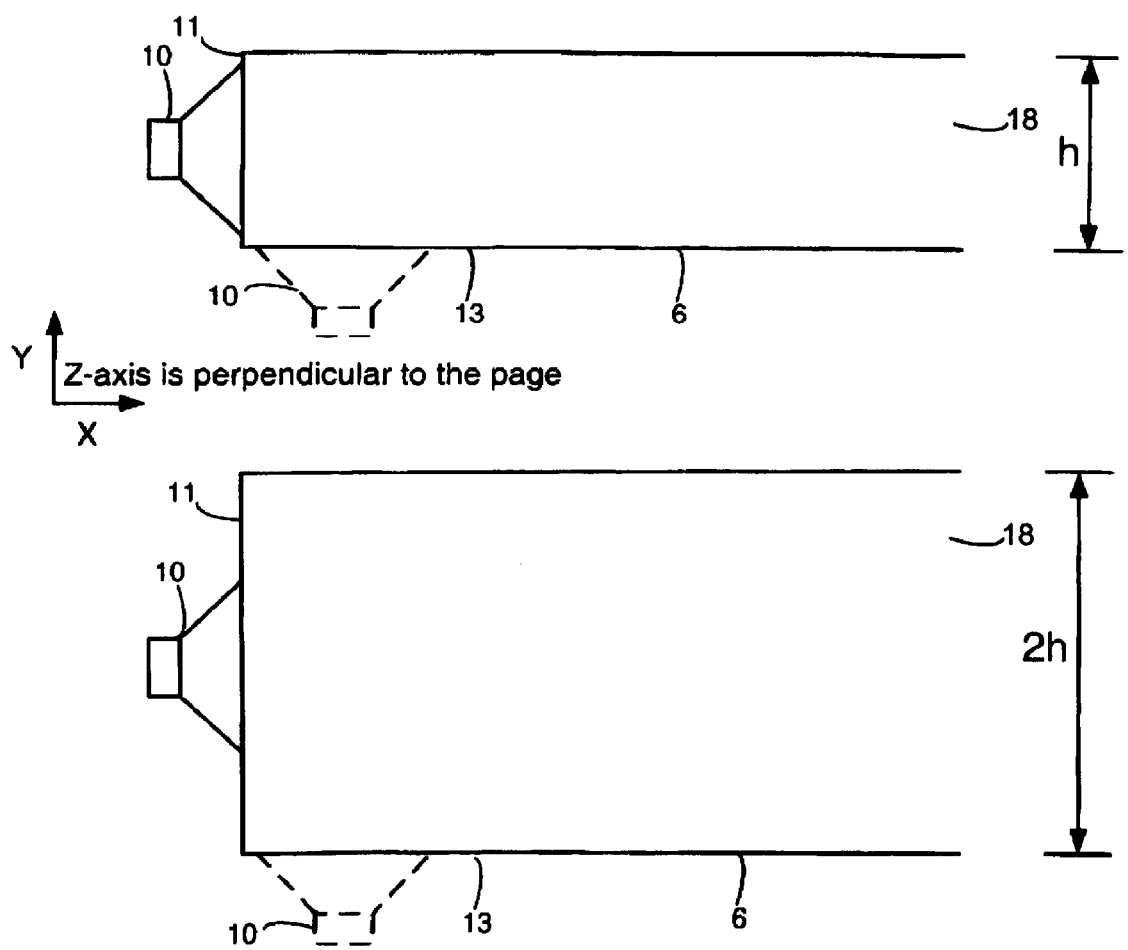

FIGS. 1A and 1B show some geometric objects useful in understanding some of the figures that follow. FIG. 1A is an isometric view of two waveguides 6 and 7. Waveguides 6 and 7 are depicted as structures having rectangular cross-sections in the Y-Z plane and an X-dimension longer than both the Y- and Z-dimensions. The area dimension in the Y-Z plane (hereinafter the "area dimension") of waveguide 6 is A and the linear dimension along the Y-axis is h. In the specification, there are references to changes in the area dimension. In the corresponding figures, changes to the area are depicted by changes in dimension in the Y-direction, holding the dimension in the Z-direction uniform. So for example, a waveguide 7 with an area dimension of 2A would be depicted in the corresponding figure by a doubling of the linear dimension h along the Y-axis to 2h. FIG. 1B shows the waveguides of FIG. 1A as cross sections in the X-Y plane and includes some additional elements. Except where otherwise specified, the waveguides in the following figures are shown as cross-sections in the X-Y plane, with the longest dimension in the X-dimension. Except where otherwise specified, "length" refers to the length of the acoustic path through the waveguide. Since waveguides are frequently bent or curved, the length may be greater than the X-dimension of a device incorporating the waveguide. Acoustic waveguides typically have at least one open end 18 and may have a closed end 11. An acoustic driver 10 is typically mounted in the closed end 11 as shown, but may be mounted in one of the walls 13 as represented by the dashed line. In the figures that follow, the acoustic driver is shown as mounted in closed end 11.

FIG. 2 shows a first waveguide assembly 100. An acoustic driver 10 is mounted in one end of a waveguide 12A that is low loss and preferably substantially lossless through the frequency range of operation of the waveguide. The waveguide 12A has a cross-sectional area A and an effective acoustic length l. The waveguide has a tuning frequency which is determined principally by the effective acoustic length of the waveguide, which is the physical length plus end effect corrections. End effect corrections may be determined using estimation techniques or empirically. For simplicity, in the figures the length l will be shown as the physical length and the term "length" will refer to the effective acoustic length. The waveguide 12A has a volume given by lA.

FIG. 3A shows a second waveguide assembly. An acoustic driver 10 is coupled to a waveguide 12B that is low loss and preferably substantially lossless through the frequency range of operation of the waveguide. Waveguide 12B has a physical length $\beta l$ and a cross-sectional area $\beta A$, where $\beta$ is a factor <1. The volume of the waveguide 12B is $\beta^2 lA$. Acoustically coupled by opening 34 to the waveguide 12B is an acoustic volume or chamber 22. The volume of the chamber 22 is $lA - \beta^2 lA$, so that the volume of the waveguide 12B plus the volume of the chamber 22 is the same as the volume of the waveguide 12A of FIG. 2. An effect of the chamber 22 is that the waveguide 12B has essentially the same tuning frequency as the waveguide 12A of FIG. 2 despite having a shorter physical length. An advantage of the waveguide of FIG. 3A is that (except as described below in the discussion of Helmholtz resonators and in the discussion of FIGS. 6A and 6B) the chamber 22 can be many shapes so long as the chamber 22 has the correct volume dimension. So, for example, as shown in FIG. 3B, the walls of chamber 22 can form a gradually curved surface 31 which forms the walls of the waveguide 12B. A waveguide having a gradual curve causes less turbulence and undesirable noise than waveguides with a more abrupt curve or change in direction and also use space efficiently. As long as the intended volume is maintained, the dimensions of chamber 22 may have a wide range of values, except as discussed below in the discussion of FIGS. 6A and 6B.

FIGS. 3C and 3D show cross-sections of a waveguide assembly in the Y-Z plane, so that the x-dimension (the longest dimension of the waveguide) is perpendicular to the sheet of the drawing. In the waveguide of FIG. 3C, the chamber 22 has a dimension in the Y direction and the Z direction that is larger than the Y and Z dimension of the waveguide 12B so that the chamber partially or completely envelops the waveguide. If desired, for example for ease of manufacture, a barrier 46 or a barrier 48 or both may be placed in the waveguide 12B or the chamber, respectively (so that there are two waveguides 12B-1 and 12B-2 or two chambers 22A and 22B or both), and achieve the same acoustic result as if there were no barriers. Sight lines 52, 54, and 56 will be referenced below. To eliminate high frequency peaks, there may be a small amount of acoustically resistant material in accordance with U.S. Pat. No. 6,278,789 in the waveguide of FIG. 3A and in the waveguides of all subsequent figures.

The concepts of reducing the cross-sectional area and length of a waveguide and adding a chamber to the waveguide as shown in FIGS. 3A and 3B can be applied to portions of waveguides, for example stepped portions of stepped waveguides, as well as whole waveguides, for example stepped waveguides. FIG. 4A shows a stepped waveguide 12C according to U.S. Pat. No. 6,771,787. An acoustic driver 10 is mounted in one end of the stepped waveguide 12C. The stepped waveguide 12C has four sections 24-27 along the length of the waveguide, with section 24 adjacent the acoustic driver and section 27 adjacent the open end 18 of the waveguide. The sections are of substantially equal length l. Section 24 has a cross sectional area $A_1$, section 25 has a cross sectional area $A_2$, which is larger than $A_1$; section 26 has a cross sectional area $A_3$, and section 27 has a cross sectional area $A_4$ which is larger than cross sectional area $A_3$. The volume $V_1$ of section 24 is $A_1 l$, the volume $V_2$ of section 25 is $A_2 l$, the volume $V_3$ of section 26 is $A_3 l$ and the volume $V_4$ of section 26 is $A_4 l$. In conventional waveguides, radiation from a surface of the acoustic driver that faces the environment (hereinafter the exterior surface) is out of phase with radiation from the surface of the acoustic driver that faces into the waveguide. At wavelengths equal to the effective acoustic length of the waveguide, the radiation from the waveguide and the radiation from the exterior surface of the acoustic driver destructively interfere, reducing the combined radiation of the waveguide and the acoustic driver. In a waveguide system according to FIG. 4A, the radiation from the waveguide is greater than the radiation from the exterior surface of the acoustic driver, and therefore the dip in the combined radiation from the waveguide and the exterior surface is eliminated. In one embodiment, the waveguide assembly of FIG. 4A, $A_1 = A_3$, $A_2 = A_4$, and $$\frac{A_1}{A_2} = \frac{A_3}{A_4} = \frac{1}{\sqrt{3}}.$$

The operation of the waveguide assembly of FIG. 4A is described in U.S. Pat. No. 6,711,787.

FIG. 4B illustrates a waveguide system using chambers acoustically coupled to the waveguide so that the waveguide is shorter than a corresponding conventional waveguide. An acoustic driver 10 is mounted in one end of a waveguide 12D. Waveguide 12D, and waveguides in the subsequent figures, is low loss and preferably substantially lossless through the frequency range of operation of the waveguide. The waveguide 12D has a cross sectional area equal to the cross sectional area $A_1$ of sections 24 and 26 of the waveguide of FIG. 4A. Sections 25 and 27 of FIG. 4A have been replaced by sections 25' and 27', respectively. Sections 25' and 27' have a physical length of $\beta l$ and a cross-sectional area $A'_2$ equal to $\beta A_2$ where $\beta$ is a number $0<\beta<1$. In this example $$\beta = \frac{1}{\sqrt{3}},$$

so that the waveguide of FIG. 4B has a uniform cross-sectional area A throughout the length of the waveguide. Sections 24' and 26' have a cross-sectional area of A and volumes ($V_1$ and $V_3$ respectively) of $lA$. Sections 25' and section 27' have a cross-sectional area of $A'_2$ and volumes ($V'_2$ and $V'_4$ respectively) of $\beta^2 A_2 l$. At a distance $d_1$ (where $l < d_1 < l \times \beta l$, in one example $$d_1 = l + \frac{\beta l}{2})$$

from the acoustic driver end of the waveguide, a chamber 22 is acoustically coupled to the waveguide through an opening 34. At a distance $d_2$ (where $l+\beta l+l < d_2 < l+\beta l+l+\beta l$, in one example $$d_2 = l + \beta l + l + \frac{\beta l}{2})$$

from the acoustic driver end 11 of the waveguide, a chamber 29 is acoustically coupled to the waveguide through an opening 38. Chamber 22 has a volume dimension $V_c$ of $A_2 l(1-\beta^2)$ so that $V'_2 + V_c = V_2$, and chamber 29 has a volume dimension $V_D$ of $A_4 l(1-\beta^2)$ so that $V'_4 + V_c = V_4$, so that the total volume occupied by the assembly of FIG. 4B and the total volume occupied by the assembly of FIG. 4A are substantially equal. As stated above, so long as the chambers have the correct volume, the volume can have any shape, orientation, or linear dimensions of the chambers, except as shown below in FIGS. 6A and 6B and discussed in the corresponding portion of the specification.

The opening 34 or 38 may have an area such that it may form, with the chamber 22 or 29, respectively, a Helmholtz resonator which could have adverse acoustic effects on the operation of the waveguide system. Helmholtz resonators are described in, for example, http://www.phys.unsw.edu.au/jw/Helmholtz.html, a copy of which is attached as an appendix. However, the dimensions of the opening 34 and of the chamber 22 can be selected so that the Helmholtz resonance frequency is at a frequency that does not adversely affect the operation of the waveguide system or that is outside the operating frequency range of the waveguide. Selecting dimensions so that the Helmholtz resonance frequency is outside the operating frequency of the waveguide can be done by making the width of openings 34 and 38 to the chambers 22 and 29 respectively, close to (for example >50% of) the width of the chambers.

The tuning of the waveguide 12D of FIG. 4B is essentially the same as the tuning of the waveguide 12C of FIG. 4A. Sections 24' and 26' of FIG. 4B have the same effect on the tuning of the waveguide as sections 24 and 26 of FIG. 4A. Sections 25' and 27' of FIG. 4B have the same effect on the tuning of the waveguide as sections 25 and 27 of FIG. 4A, even though the physical length of sections 25' and 27' of FIG. 4B is $\beta l$ which (since $\beta < 1$) is shorter than the physical length $l$ of sections 25 and 27 of FIG. 1.

The figures disclosed above are merely illustrative and not exhaustive and many variations are possible. For example, the waveguide may have more than four sections; sections such as sections 25' and 27' may have different lengths; the volume dimensions of sections such as 25' and 27' may have different volume dimensions; the combined volume dimensions such as $V_3$ and $V_4$ may not be equal to $V_2$; and as will be seen below, different configurations of the chambers are possible (for example, there may be different numbers of chambers, and the chambers may have different volume dimensions, shapes, and placements along the waveguide as will be described below).

In addition to providing the same tuning frequency with a waveguide of shorter length, the waveguide system of FIG. 4B has the same advantage of FIG. 4A with regard to eliminating the dip in the combined output of the acoustic driver and the waveguide at frequencies at which the corresponding wavelength equals the effective length of the waveguide. At these frequencies, the acoustic output of the waveguide is greater than the acoustic output radiated directly to the environment by acoustic driver, so the combined radiation from the waveguide and the acoustic driver is greater than the combined output from a conventional waveguide system. The waveguide assembly of FIG. 4B is also less prone than the waveguide assembly of FIG. 4A to wind noises that can occur at abrupt area discontinuities.

Figure 4C:
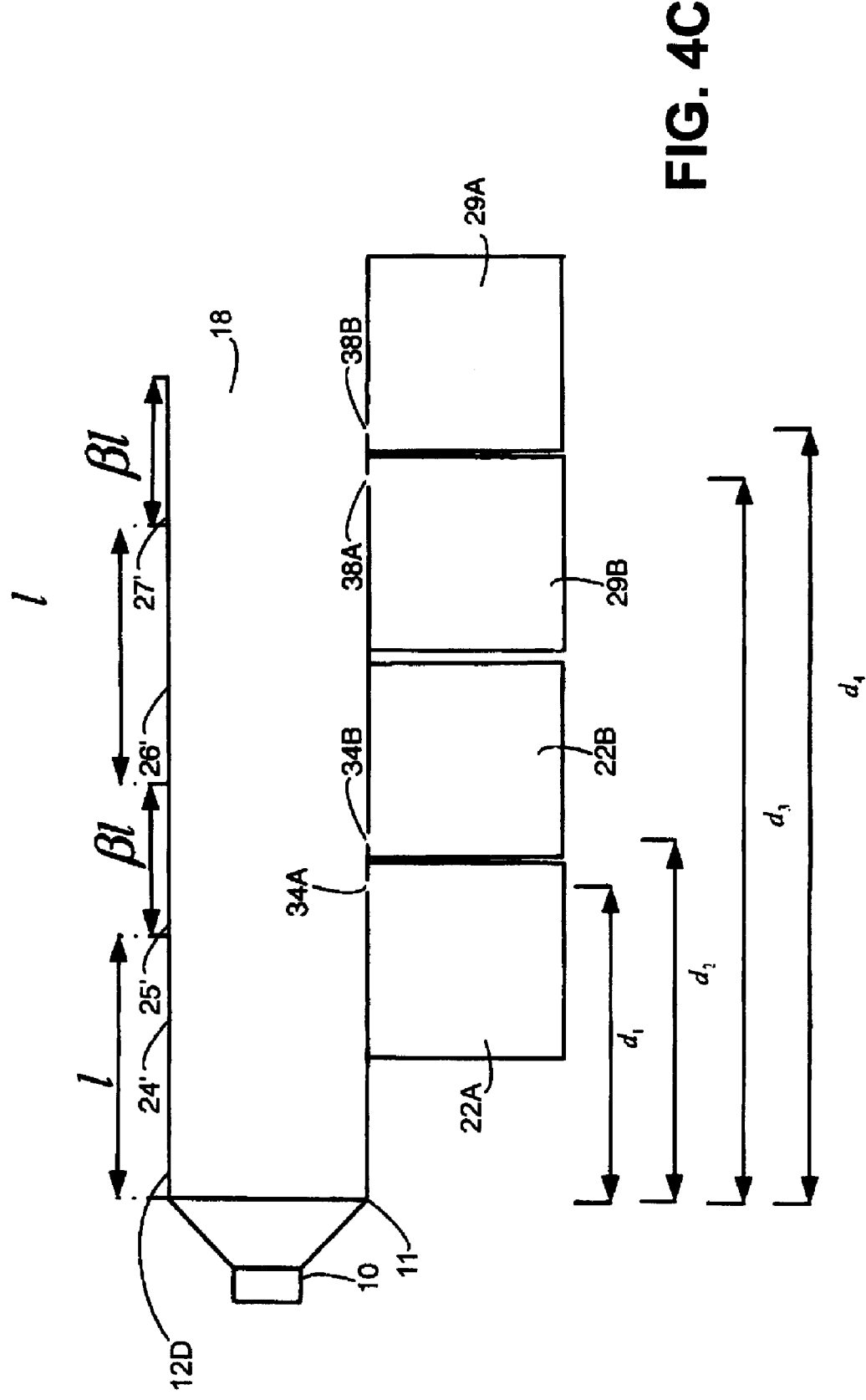

FIG. 4C shows a variation of the waveguide assembly of FIG. 4B. In the waveguide assembly of FIG. 4C, the chamber 22 of FIG. 4B is replaced by chambers 22A and 22B with a total volume equal to the volume of chamber 22. The entrance to chamber 22A is placed at distance $d_1$ such that $$l < d_1 < l + \frac{\beta l}{2}$$

from the acoustic driver, in one example $$d_1 = l + \frac{\beta l}{4}$$

and the entrance 34B to chamber 22B is placed at distance $d_2$ such that $$l + \frac{\beta l}{2} < d_2 < l + \beta l$$

from the acoustic driver, in one example $$d_1 = l + \frac{3\beta l}{4}.$$

Chamber 29 of FIG. 4B is replaced by chambers 29A and 29B with a total volume equal to the volume of chamber 29. The entrance 38A to chamber 29A is placed at distance $d_3$ such that $$l + \beta l + l < d_3 < l + \beta l + l + \frac{\beta l}{2}$$

from the acoustic driver, in one example $$d_3 = l + \beta l + l + \frac{\beta l}{4}$$

and the entrance 38B to chamber 29B is placed at distance $d_4$ such that $$l + \beta l + l + \frac{\beta l}{2} < d_4 < l + \beta l + l + \beta l$$

from the acoustic driver, in one example $$d_4 = l + \beta l + l + \frac{3\beta l}{4}.$$

The effect of the tuning of the waveguide assembly of chambers 22A and 22B is substantially the same as the effect of chamber 22 of FIG. 4B, and the effect of on the tuning of the waveguide assembly of chambers 29A and 29B substantially is the same as the effect of chamber 26 of FIG. 4B and have the same beneficial effect of alleviating the dip in the output of the waveguide assembly at the frequency at which the wavelength equals the effective length of the waveguide. Generally, using multiple chambers permits the tuning frequency to more closely match the tuning frequency of the equivalent stepped waveguide such as the waveguide of FIG. 4A.

Figure 4F:
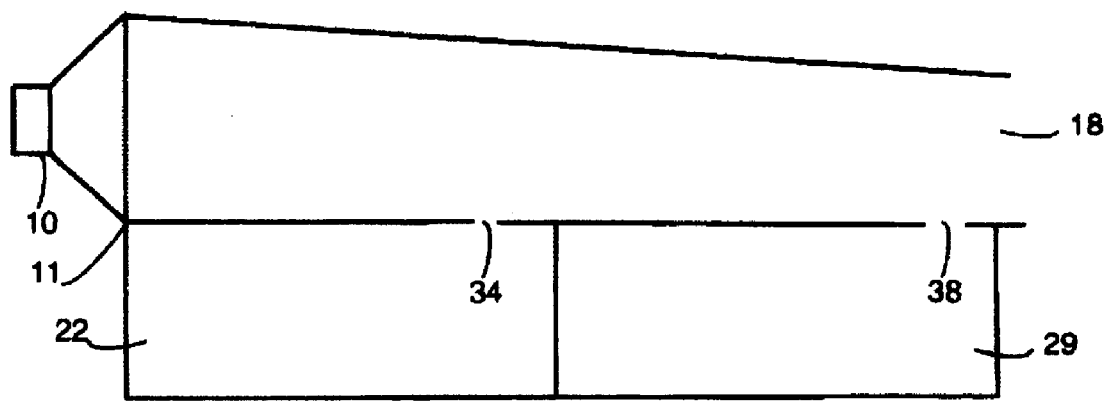

Aspects of FIGS. 4A, 4B, and 4C can be combined. For example, the waveguide assembly of FIG. 4D has a chamber 32 coupled to the waveguide 12E in the first section at distance d1, where l<d1<l+βl and a stepped section 27 beginning at distance d2=l+βl+l. The waveguide assembly of FIG. 4E has a waveguide 12F with a stepped section 25 beginning at distance $d_1$=l and a chamber 29 at a distance d2 >l+l+l. Aspects of FIGS. 4A, 4B, and 4C can also be implemented in a tapered waveguide of the type shown in FIG. 1 of U.S. Pat. No. 6,771,787, as shown in FIG. 4F. For use in a tapered waveguide, the size of the chambers and the location of the openings from the waveguide to the chambers may be determined by modeling. A waveguide such as the waveguide with substantially continuous walls such as the waveguide of FIG. 4F may be less subject to wind noises that may occur at abrupt area discontinuities. The waveguide assembly of FIG. 4G is a diagrammatic view of a practical waveguide assembly incorporating elements of FIGS. 4A -4E. The implementation of FIG. 4G has six 2.25 inch acoustic drivers 10A-10F and dimensions as shown.

Figure 5B:
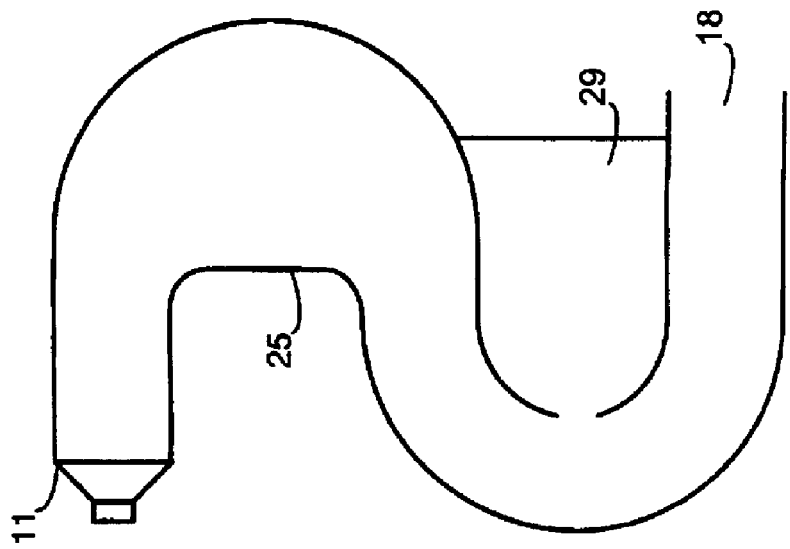
FIGS. 5A and 5B are diagrammatic views of a waveguide assembly.
Figure 5A:
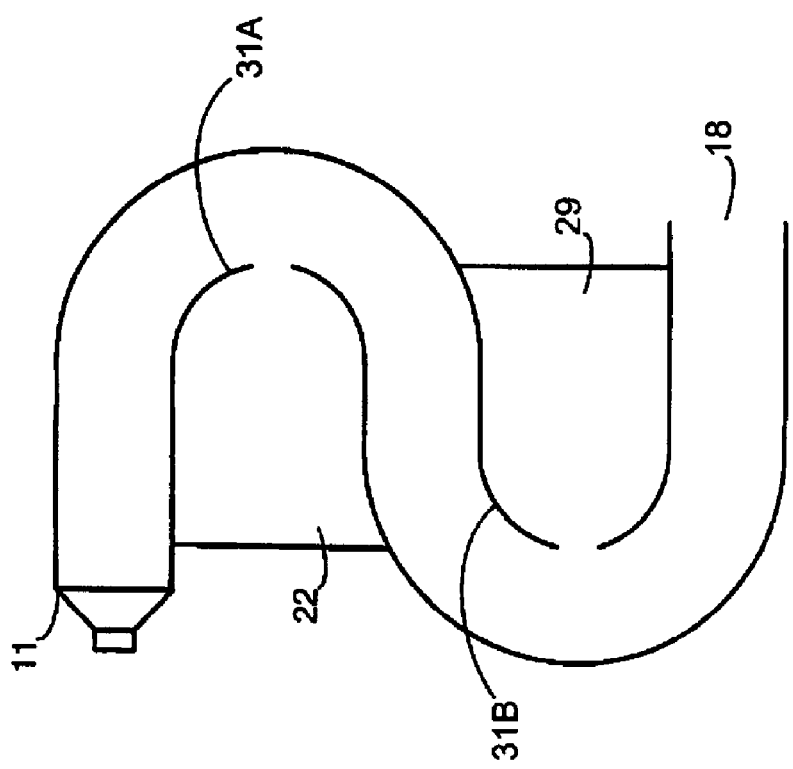

FIG. 5A shows an implementation of the waveguide assembly shown schematically in FIG. 4B illustrating walls of chambers 22 and 29 forming multiple curved surfaces 31A and 31B which also forms walls of the waveguide resulting in less turbulence than would occur with a more abrupt curve, while using space efficiently. The reference numbers in FIG. 5A indicate similarly numbered elements in the corresponding waveguide system of FIG. 4B. FIG. 5B shows an implementation of the waveguide shown schematically in FIG. 4E illustrating walls of chamber 29 and stepped section 25. The reference numbers in FIG. 5B indicate similarly numbered elements in the corresponding waveguide system of FIG. 4E.

FIGS. 6A and 6B illustrate another feature of a waveguide assembly. In FIG. 6A, waveguide 12B is acoustically coupled to a chamber 22 through an opening 34. Acoustic waves enter the opening 34 and propagate into the chamber 22 along a number of acoustic paths, for example path 66A until the acoustic waves encounter an acoustic boundary. There may be many acoustic paths along which the acoustic waves propagate; for simplicity only one is shown.

Generally, it is desirable to configure the chamber so that the lengths of all acoustic paths are significantly shorter than one-fourth of the effective acoustic length of the waveguide 12B. If the length of one of the acoustic paths is not significantly shorter than one fourth (for example, not shorter than 10%) of the effective acoustic length of the waveguide, output dips may occur at certain frequencies. In one example, a waveguide assembly similar to waveguide assembly of FIG. 4B is tuned to 44 Hz, so that it has an effective acoustic length of 1.96 m. (6.43 feet). A chamber 22 with a volume of 1851.1 cc (114 cubic inches) is coupled to waveguide 12B at a position 39.6 cm (15.6 inches) from the closed end 11. Chamber 22 has an acoustic path 66A (see FIG. 6A) that has a length of 40.6 cm (16 inches), that is $$\frac{40.6 \text{ cm}}{1.96 \text{ m}} \times 100 = 20.7\%$$

of the effective acoustic length of the waveguide assembly. An undesirable dip in the frequency response may occur at about 200 Hz. Depending on factors such as the distance of the chamber 22 from the closed end 11, the dip in the frequency response may occur when the length of acoustic path 66A is as short as 25.4 cm (10 inches), which is $$\frac{25.4 \text{ cm}}{1.96 \text{ m}} \times 100 = 13.0\%$$

of the effective acoustic length of waveguide 12B.

One way of eliminating the frequency response dip is to reconfigure chamber 22 so that acoustic path 66A has a length shorter than 10% (in this case 19.6 cm) of the effective acoustic length of the waveguide system. However in a practical waveguide, it may be difficult to reconfigure the chamber so that acoustic path 66A has a length of less than 10% of the effective acoustic length of the waveguide system.

Another way of eliminating the frequency response dip is to add structure to the chamber 22 that changes the length of an acoustic path such as 66A to a length that does not cause a frequency response dip. FIG. 6B shows the waveguide system of FIG. 6A with baffles 42 inserted into the chamber so that the length of acoustic path 66B is 50.8±1.3 cm (20±0.5 inches). The waveguide system of FIG. 6B does not have the frequency response dip of the waveguide system of FIG. 6A. The path length dimensions at which dips may occur and the range of path lengths at which dips do not occur, and the variance of the path length with regard to the placement of the chamber opening relative to the ends of the waveguide can be determined by modeling or experimentation. If the situation shown in FIGS. 6A and 6B occurs, it is generally desirable to shorten the path length because the tolerance (the range of path lengths that result in no dip) is wider. In the example above, any length shorter than 25.4 cm is suitable, but the tolerance of the longer acoustic path is only ±1.3 cm.

Figure 7A:
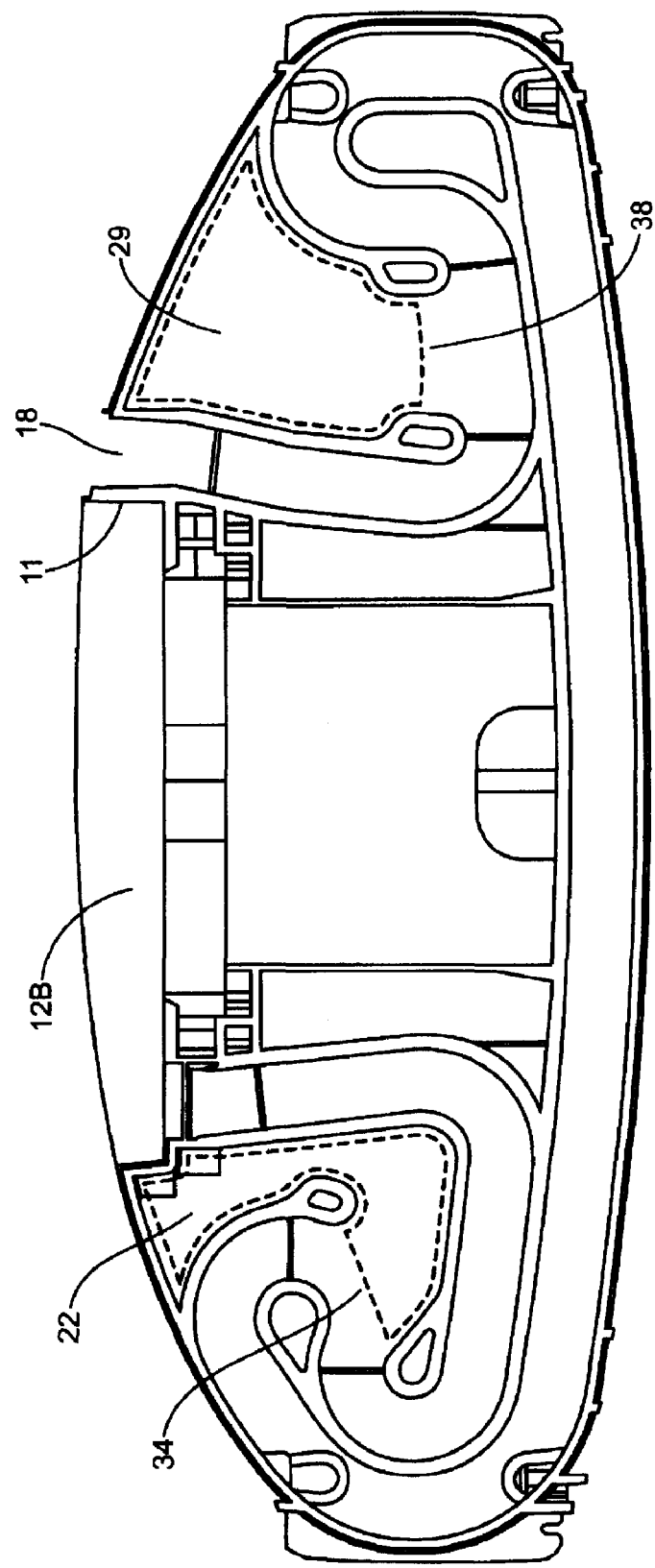

FIGS. 7A and 7B show a practical implementation of an audio reproduction device incorporating a waveguide assembly having features shown diagrammatically in previous figures. The elements in FIGS. 7A and 7B correspond to similarly numbered elements in the previous figures. The dashed lines in FIGS. 7A and 7B illustrate the boundaries of the chambers 22 and 29. FIG. 7A is a cross section in the X-Z plane of the audio reproduction device. The waveguide assembly 12B has the form of the waveguide assembly of FIG. 3C and the cross section is taken along a sight line corresponding to sight line 52 or 54 of FIG. 3C; the cross sections taken along sight lines corresponding to sight lines 52 and 54 are substantially identical. There is a barrier 46 (of FIG. 3C, not shown in this view) resulting in the waveguide assembly having two waveguides. FIG. 7B is a cross section in the X-Z plane, taken along a sight line corresponding to sight line 56 of FIG. 3C. The acoustic driver 10 (of previous figures), not shown in this view is coupled to the waveguide 12B. Compartments 58 and 60 are for high frequency acoustic drivers (not shown), which are not germane to the waveguide assembly. In the implementation of FIGS. 7A and 7B, volume $V_1$ of chamber 22 is about 1861 cm³ (114 cubic inches); the volume $V_2$ of chamber 29 is about 836 cm³ (51 cubic inches); the physical length of the waveguide is about 132.1 cm (52 inches); the center of opening 34 to chamber 22 is located about 39.6 cm (15.6 inches) from closed end 11 and the width of opening 34 is about 3.8 cm (1.5 inches); the center of opening 38 to chamber 29 is about 11.7 cm (4.6 inches) from the open end 18 of the waveguide and the width of opening 38 is about 3.8 cm (1.5 inches); and the waveguide is tuned to about 44 Hz.

The waveguide assembly of FIG. 7C has two low frequency acoustic drivers 10A and 10B. The elements in FIG. 7C correspond to similarly reference numbered elements in the previous figures. The second section of the waveguide 12 has coupled to it two chambers 22A and 22B by openings 34A and 34B, respectively. The fourth section of the waveguide 12 has coupled to it a single chamber 26 by opening 38. The walls of the waveguide 12 form walls (which for the purposes of this application includes following substantially the same outline as the walls) of chambers 22A and 22B and substantially enclose chambers 22A and 22B. Chambers 22A and 22B are "teardrop" shaped to provide large turning radii for the waveguide, providing a lessening of turbulence than would occur with smaller turning radii or with sharp bends. Chamber 26 provides a large chamber with low air velocity that provides a convenient location for electronics components 36. The low velocity air causes less turbulence when it encounters the electronics 36. The irregular, multiply curved shape of chamber 26 permits the assembly to be fit efficiently into a small device enclosure 34. High frequency acoustic drivers 33 do not radiate into the waveguide 12.

The waveguide assembly of FIG. 7D is a practical implementation of the waveguide illustrated schematically in FIG. 4F. The elements of FIG. 7D correspond to similarly reference numbers in FIG. 4F.

Figure 8:
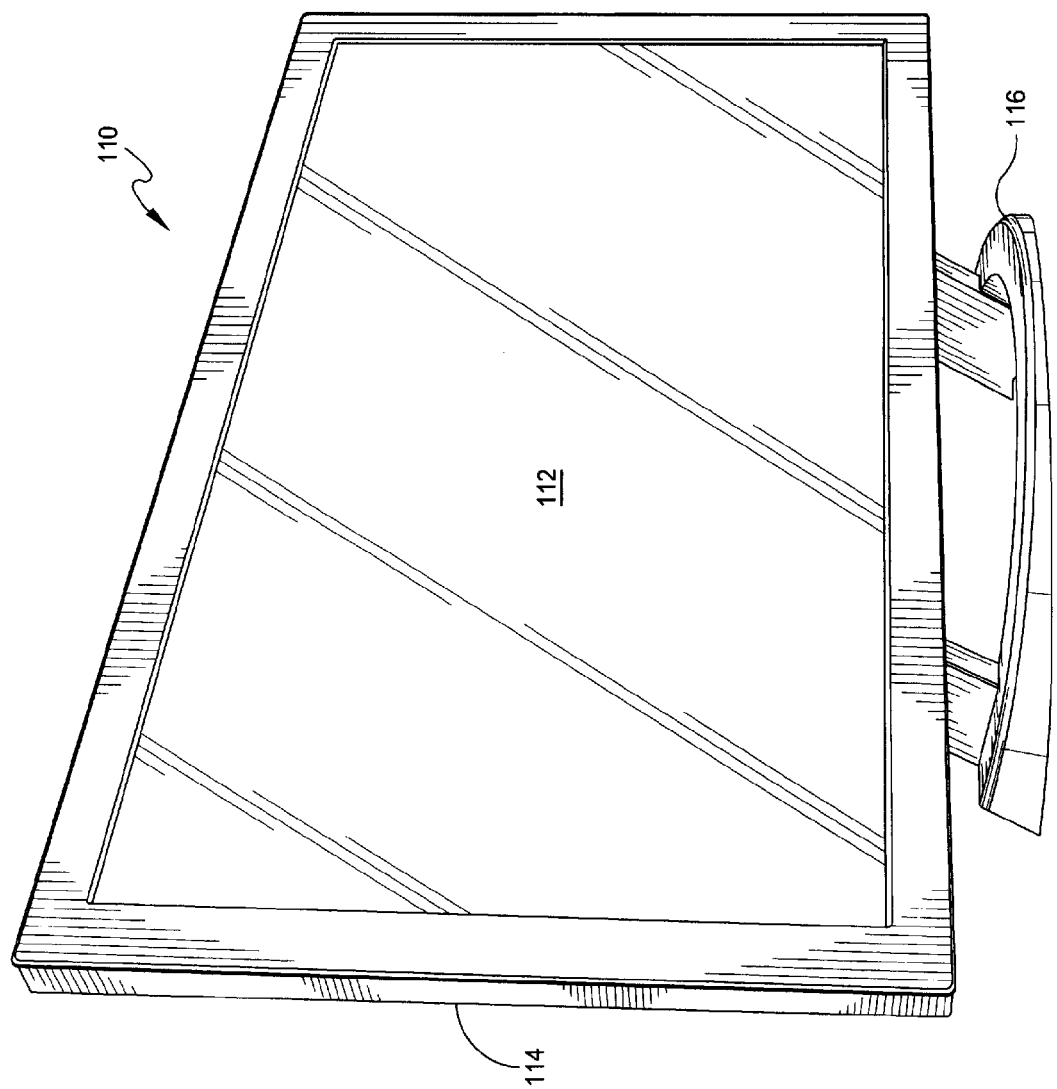
FIG. 8 is a perspective view of an image display apparatus.

Turning to FIG. 8, an image display apparatus such as a television 110 includes a flat panel display device 112. The television 110 may or may not contain a video tuner (if the latter, the video tuner would be in, e.g., a cable or satellite receiver). Another type of image display apparatus, for example, is a display for presenting images from a local or networked computer. A flat panel display as used in this application includes at least the following types of displays: plasma, LCD, organic light-emitting diode, light-emitting diode, electroluminescent, surface-conduction electron emitter, field emission, cholesteric and electrophoretic. A flat panel display as used in this application does not include a CRT type display. The display device 112 is capable of presenting video images, still images and other types of graphical information. The television 110 includes a housing 114 for supporting the flat panel display device and a stand 116 for supporting the television 110 on a horizontal surface such as a table top. Alternatively, the stand 116 can be removed from the television 110 and the television 116 can be mounted on a wall using VESA mounts on the back of the housing 114.

Figure 9:
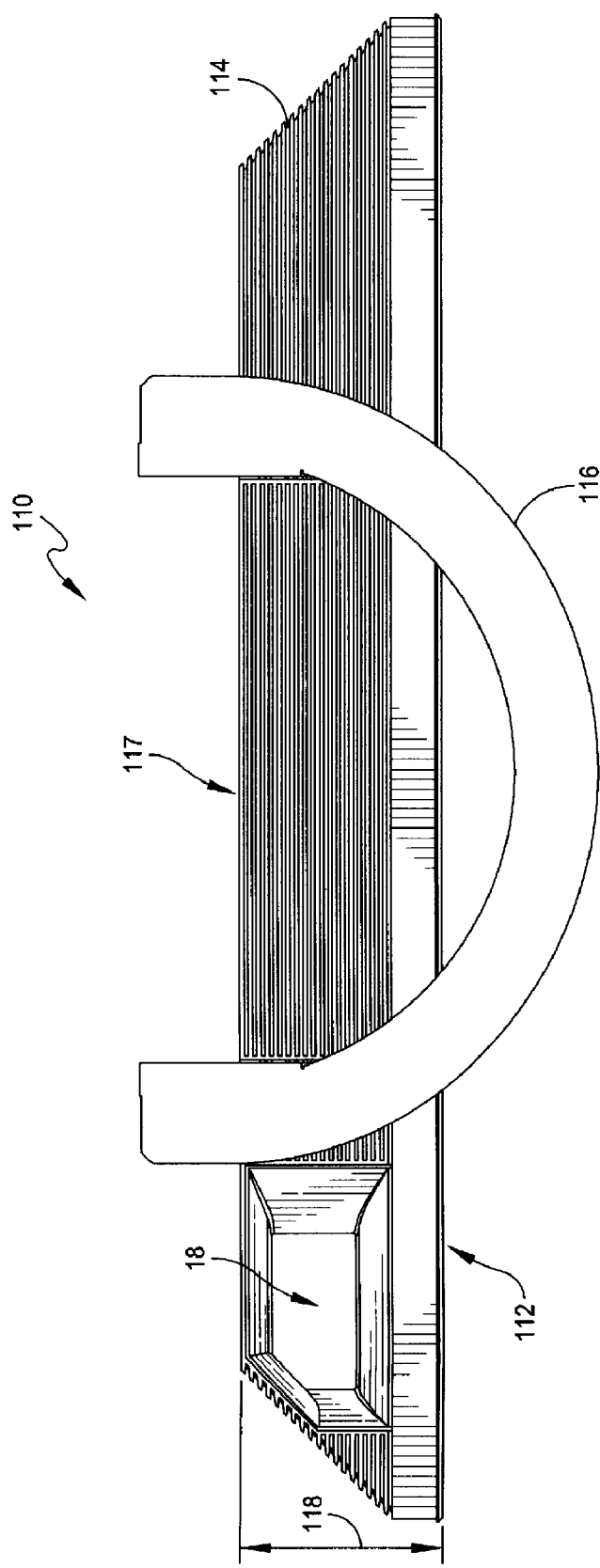
FIG. 9 is a bottom view of the image display apparatus of FIG. 8.

With reference to FIGS. 7D and 9, the waveguide 12 (an acoustic volume) is located substantially inside of the housing 114 and behind the display device 112. The waveguide 12 is a physical structure that may be distinct from the housing 114. Alternatively, portions of the housing 114 may also be portions of the waveguide 112. Three pairs of acoustic drivers 10A/10D, 10B/10E and 10C/10F are used to acoustically energize the waveguide 12. It is preferable that at least two drivers be used so that their mechanical vibrations substantially cancel out. An odd number of drivers (e.g. 3, 5, 7) could be used as long as they are constructed and arranged so that mechanical vibrational energy from the drivers substantially cancels out and acoustic energy adds together.

A first surface of each acoustic driver radiates sound waves into the waveguide 12 so that the sound waves are radiated from the waveguide at an exit 18. A second surface of each acoustic driver radiates sound waves to the environment through a path such as a duct (not shown) that does not include the waveguide 12. These ducts (one for drivers 10A, B and C, and one for drivers 10D, E and F) each vent the acoustic energy through a duct exit and then louvers 117 in the bottom of the housing 114. The louvers 117 have little to no effect on the low frequency acoustic energy exiting the ducts. This is because the velocity of the air in the ducts and moving back and forth at the louvers 117 is relatively low. The louvers 117, however, preferably do not cover the exit 18 of the waveguide 12 because the air velocity at the exit 18 is relatively high and acoustic noise would be caused by the louvers 117. The air flow in the exit of the waveguide 12 and the exits of the ducts is preferably substantially parallel to a surface of the display from which images are projected. Even though the exits are located in this example along the bottom of the housing 114, one or more of these exits could be located along one or both sides of the housing 114 and/or along the top of the housing 114. Having any of these exits facing out of the back of the housing 114 is not preferred as this can reduce system performance and/or cause vibrations in the television when the back of the housing 114 is placed near a wall.

By using a two or more smaller acoustic drivers (in this example six) instead of one large acoustic driver to energize the waveguide 12, a thickness of the drivers/waveguide assembly in a direction normal to a display surface of the display device can be significantly reduced. As such, the outside diameter of a cone assembly including a surround for each acoustic driver is preferably less than about 85 mm, more preferably less than about 75 mm, and most preferably less than about 65 mm. It is also preferable to have a relatively long peak-to-peak stroke for each acoustic driver in order to enhance the acoustic output of each driver when the driver has a relatively small cone/surround diameter. A maximum stroke peak-to-peak for each acoustic driver is preferably at least about 15 mm, more preferably at least about 18 mm, and most preferably at least about 21 mm. These are the absolute maximum excursion limits for the drivers.

A second acoustic volume (e.g. 22A) is acoustically coupled to the waveguide and increases the amplitude of the sound waves radiated from the acoustic waveguide 12 at a wavelength at which radiation from the waveguide exit 18 and radiation from the second surface of the acoustic drivers destructively interfere. All of the drivers preferably receive substantially the same input audio signal at substantially the same time. The drivers in each pair are positioned opposite each other such that the acoustic energy put into the waveguide 12 from each pair is additive and the vibrational (mechanical) energy from each driver pair substantially cancels out. This happens because the moving surfaces in each driver pair are moving towards each other, moving away from each other, or not moving.

Each acoustic driver 10A-F vibrates in a direction that is substantially parallel to a surface of the display device from which video images are projected. The waveguide 12 in this example has only a single exit 18 to an atmosphere external to the housing 114. Alternatively, a waveguide can be used that has two exits to the atmosphere. The exit 18 of the waveguide 12 faces in a substantially downward direction when the television 110 is placed on a substantially horizontal surface (not shown). The waveguide exit could alternatively face in an upwards or sideways direction. The housing 114 has a thickness 118 in a direction that is substantially normal to a surface of the display device 112 from which video images are projected that is preferably less than about 200 mm thick, more preferably less than about 175 mm thick, and most preferably less than about 160 mm thick. A surface of the display device 112 has a portion from which video images are projected that has a diagonal measurement that is preferably less than about 152.4 cm long, more preferably less than about 137 cm long, and most preferably less than about 117 cm long.

Figure 10:
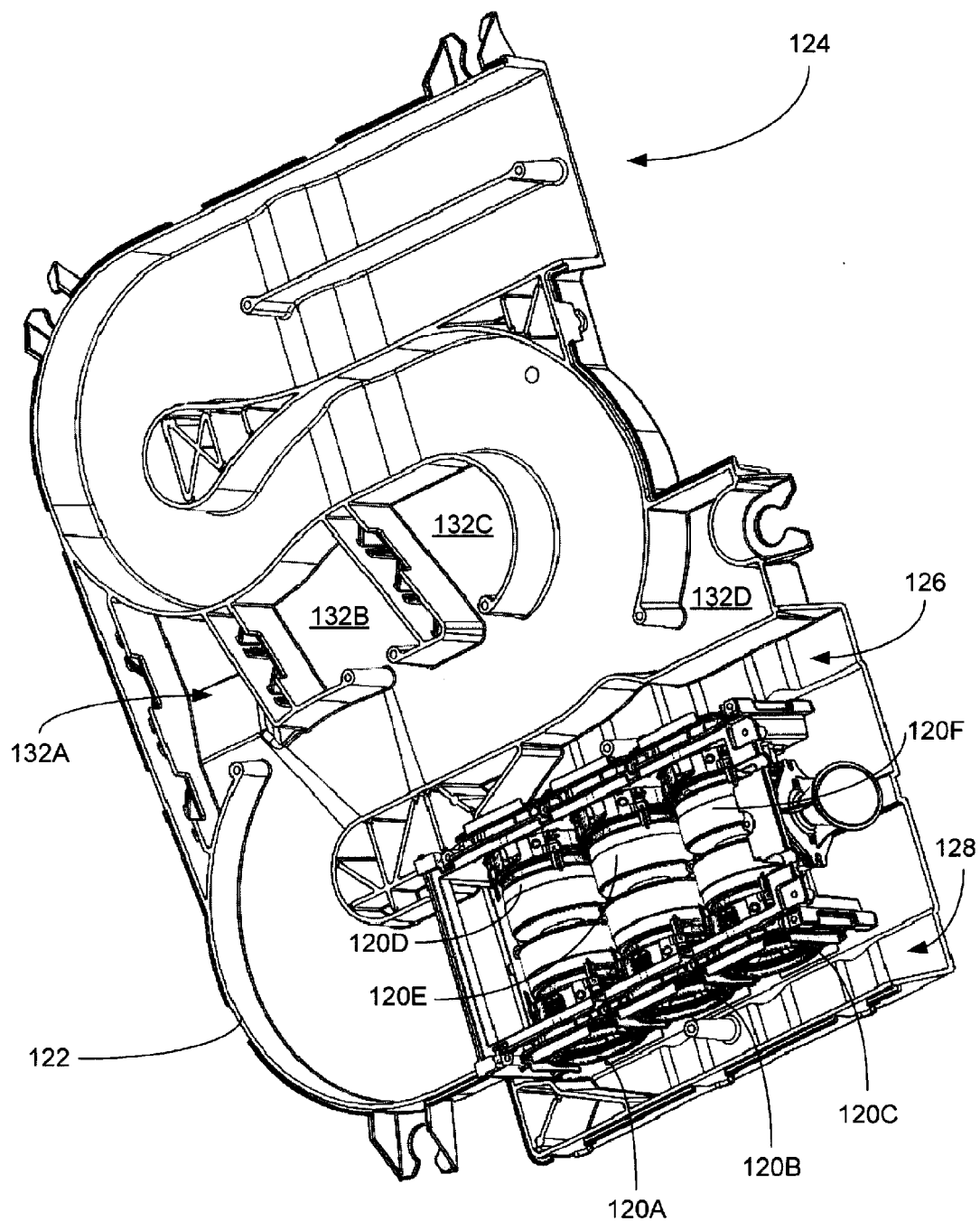
FIG. 10 is a perspective sectional view of another example of a waveguide.

FIG. 10 discloses another example of an acoustic volume embodied in a waveguide 122 similar to the waveguide 12 shown in FIG. 7D. The waveguide 122 is also acoustically energized by six acoustic drivers 120A-F. As described above, a first surface of each acoustic driver radiates sound waves into the waveguide 122 so that the sound waves are radiated from the waveguide at an exit 124. A second surface of each acoustic driver radiates sound waves to the environment through a path including a pair of ducts 126, 128 that does not include the waveguide 122. The duct 126 (for drivers 120D, E and F) and the duct 128 (for drivers 120A, B and C) vent the acoustic energy through louvers 117 in the bottom of the housing 114. In this example there are four acoustic volumes 132A-D which are each acoustically coupled to the waveguide 122 and increases the amplitude of the sound waves radiated from the acoustic waveguide 122 at a wavelength at which radiation from the waveguide exit 124 and radiation from the ducts 126 and 128 destructively interfere.

By incorporating the waveguides as described previously with the configuration of transducers discussed above, substantial acoustical output can be generated at low frequencies (e.g. from about 40 hz to about 80 hz) with low levels of distortion from an audio system integrated within a video display of compact dimension, without introducing excessive vibration into the display device. Arranging the transducers so that they mechanically cancel vibration, orienting them so that vibration axes are parallel to the plane of the display surface, and incorporating the entire audio sub assembly in a housing distinct from the exterior housing results in transmitting low levels of vibration into the display relative to the level of acoustical energy that can be generated by the system. The use of a housing separate from the external housing allows the audio system to be resiliently coupled to a frame that holds the display, which further reduces vibrational energy coupled into the display. U.S. patent application Ser. No. 12/388,723 filed on Feb. 19, 2009 and incorporated herein by reference, discloses vibration damping techniques related to an acoustic waveguide.

One embodiment described above mounts the waveguide 122 and drivers 120A-F of FIG. 10 into the display apparatus 110 of FIGS. 8-9. Each driver has (a) an outside diameter of the cone assembly including the surround that is about 64.52mm, (b) a maximum peak-to-peak stroke of about 21mm, and (c) a distance of about 7.62mm from the outside edge of its surround to the outside edge of a surround of a nearest other driver. The display 110 includes an LCD panel with a viewable diagonal measurement of about 117cm. The display 110 is about 15cm thick. The acoustic output capability of this embodiment between about 40hz to about 80hz was measured in the following manner.

The display was placed in an anechoic chamber. A measuring microphone was placed at a distance of 1 meter on axis from the center of the video display. As such, a ratio of this distance to the viewable diagonal measurement of the LCD panel is about 1/1.17 or 0.855. An Audio Precision System Two Dual Domain test device (AP) was used to perform measurements. A complex signal was constructed to excite the system at low frequencies. The signal consisted of a sum of sinusoidal signals with frequencies that span the range of 40 to 80 Hz. The exact frequencies are provided in table 1. The sample rate used was 44.1 khz in order to get more low frequency resolution. The crest factor of the signal was about 2. The fastest test capability of the AP device was used to make frequency response and distortion measurements using the multitone waveform described above. The acoustic response of the waveguide 122 and drivers 120A-F was measured, and the energy at each fundamental frequency was summed to construct a measurement of the average maximum system output SPL in the 40-80 Hz range.

TABLE 1

| Tone Frequency Hz |
|---|
| 40.3747560938 |
| 43.0664065001 |
| 45.7580569063 |
| 48.4497073126 |
| 51.1413577183 |
| 53.8330081246 |
| 56.5246585309 |
| 59.2163089372 |
| 61.9079593435 |
| 64.5996097498 |
| 67.2912601561 |
| 69.9829105624 |
| 72.6745609686 |
| 75.3662113749 |
| 78.0578617812 |
| 80.7495121875 |

Similarly, all distortion and noise products were measured up to 600 Hz. The energy in all distortion and noise products was summed to determine an overall distortion level relative to the measured system output SPL above. For the tested device, the total average maximum system output SPL measured was 90.3 dBSPL at a total acoustic distortion and noise level of −20.6 dB (which is about 10% total distortion and noise). The total average maximum system output SPL is preferably at least about 80 dBSPL, and more preferably at least about 85 dBSPL (both with about 10% total distortion and noise). The total distortion and noise is preferably less than about 30% and more preferably less than about 20%. The ratio mentioned above is preferably at least about 0.7 and more preferably at least about 0.8.

One could try to construct a system that improved upon the SPL and distortion performance numbers given above by restricting the bandwidth of the system such that output below 80 Hz was reduced substantially (by electrically high pass filtering the signal applied to the system). In order to better compare performance, the relative output level at each end of the test band is also compared. For the embodiment tested, the acoustical output at 40 Hz was no more than 10 dB down from the acoustical output at 80 Hz. The acoustical output at 40 Hz is preferably no more than 20 dB down from the acoustical output at 80 Hz, and more preferably no more than 13 dB down from the acoustical output at 80 Hz.

The above performance levels are achieved from an audio system integrated with a flat panel display without causing visible vibration of the display surface.

Other embodiments are in the claims.

What is claimed is:

1. A television, comprising:
 a flat panel display device for presenting video images;
 a housing for supporting the flat panel display device;
 a first acoustic volume located substantially (a) inside the housing, and (b) behind the display device; and
 two or more acoustic drivers for acoustically energizing the acoustic volume, the drivers being positioned such that acoustic energy put into the acoustic volume from the drivers is substantially additive and vibrational energy from the drivers substantially cancels out.

2. The television of claim 1, wherein the acoustic volume includes a waveguide.

3. The television of claim 1, wherein the acoustic volume has only a single exit to an atmosphere external to the housing.

4. The television of claim 1, wherein an exit of the acoustic volume to an atmosphere external to the housing faces in a substantially downward direction when the television is placed on a substantially horizontal surface.

5. The television of claim 1, wherein there are six acoustic drivers which acoustically energize the acoustic volume.

6. The television of claim 1, wherein each driver vibrates in a direction that is substantially parallel to a surface of the display device from which video images are projected.

7. The television of claim 1, wherein the housing has a thickness in a direction that is substantially normal to a surface of the display device from which video images are projected that is less than about 200 mm thick.

8. The television of claim 1, wherein the first acoustic volume includes an acoustic waveguide; the acoustic drivers being mounted to the waveguide so that a first surface of each acoustic driver radiates sound waves into the waveguide so that the sound waves are radiated from the waveguide and so that a second surface of each acoustic driver radiates sound waves to the environment through a path that does not include the waveguide; and a second acoustic volume acoustically coupled to the waveguide for increasing the amplitude of the sound waves radiated from the acoustic waveguide at a wavelength at which radiation from the waveguide and radiation from the second surface of the acoustic drivers destructively interfere.

9. A television, comprising:
 a flat panel display device for presenting video images;
 a housing for supporting the flat panel display device;
 an acoustic volume located substantially (a) inside the housing, and (b) behind the display device; and
 two or more acoustic drivers which acoustically energize the acoustic volume, wherein a maximum acoustic output of the drivers measured in an anechoic chamber at one meter from a center of a surface of the display device from which video images are projected averages at least about 80 dBSPL over a range from about 40 hz to about 80 hz.

10. The television of claim 9, wherein an outside diameter of a cone assembly including a surround for each acoustic driver is less than about 85 mm.

11. The television of claim 9, wherein an outside diameter of a cone assembly including a surround for each acoustic driver is less than about 75 mm.

12. The television of claim 9, wherein an outside diameter of a cone assembly including a surround for each acoustic driver is less than about 65 mm.

13. The television of claim 9, wherein a maximum stroke peak-to-peak for each acoustic driver is at least about 15 mm.

14. The television of claim 9, wherein a maximum stroke peak-to-peak for each acoustic driver is at least about 18 mm.

15. The television of claim 9, wherein a maximum stroke peak-to-peak for each acoustic driver is at least about 21 mm.

16. The television of claim 9, wherein the maximum acoustic output of the drivers averages at least about 85 dBSPL.

17. The television of claim 9, wherein the maximum acoustic output of the drivers averages about 90 dBSPL.

18. The television of claim 9, wherein a total acoustic noise and distortion is less than about 30% when the drivers are outputting the maximum acoustic output.

19. The television of claim 9, wherein a total acoustic noise and distortion is less than about 20% when the drivers are outputting the maximum acoustic output.

20. The television of claim 9, wherein a total acoustic noise and distortion is about 10% when the drivers are outputting the maximum acoustic output.

21. The television of claim 9, wherein the acoustical output at 40 Hz is no more than about 20 dB down from the acoustical output at 80 Hz.

22. The television of claim 9, wherein the acoustical output at 40 Hz is no more than about 13 dB down from the acoustical output at 80 Hz.

23. The television of claim 9, wherein the acoustical output at 40 Hz is no more than about 10 dB down from the acoustical output at 80 Hz.

24. The television of claim 9, wherein a diagonal dimension of the surface of the display from which images are viewable is less than about 152.4 cm.

25. The television of claim 9, wherein a diagonal dimension of the surface of the display from which images are viewable is less than about 137 cm.

26. The television of claim 9, wherein a diagonal dimension of the surface of the display from which images are viewable is about 117 cm.

27. The television of claim 9, wherein an air flow in an exit of the acoustic volume is substantially parallel to a surface of the display from which images are projected.

28. A television, comprising:
a flat panel display device for presenting video images;
a housing for supporting the flat panel display device;
a waveguide located substantially (a) inside the housing, and (b) behind the display device; and
two or more acoustic drivers for acoustically energizing the waveguide, wherein the housing is less than about 200 mm thick in a direction that is substantially normal to a surface of the display device from which video images are projected.

29. The television of claim 28, wherein the housing is less than about 175 mm thick in a direction that is substantially normal to a surface of the display device from which video images are projected.

30. The television of claim 28, wherein the housing is less than about 160 mm thick in a direction that is substantially normal to a surface of the display device from which video images are projected.

31. The television of claim 28, wherein a surface of the display device has a portion from which video images are projected that has a diagonal measurement that is preferably less than about 152.4 cm long.

32. The television of claim 28, wherein a surface of the display device has a portion from which video images are projected that has a diagonal measurement that is preferably less than about 137 cm long.

33. The television of claim 28, wherein a surface of the display device has a portion from which video images are projected that has a diagonal measurement that is preferably less than about 117 cm long.

34. The television of claim 28, wherein the two or more drivers can be operated at maximum acoustic output without visibly vibrating the surface of the display.

* * * * *